US012235201B2

(12) United States Patent
Mage et al.

(10) Patent No.: US 12,235,201 B2
(45) Date of Patent: Feb. 25, 2025

(54) METHODS FOR CONTINUOUS MEASUREMENT OF BASELINE NOISE IN A FLOW CYTOMETER AND SYSTEMS FOR SAME

(71) Applicant: Becton, Dickinson and Company, Franklin Lakes, CA (US)

(72) Inventors: Peter Mage, Goleta, CA (US); Lingjie Wei, Milpitas, CA (US); Peter Johnson, Santa Cruz, CA (US); David A. Roberts, San Jose, CA (US); Keegan Owsley, Campbell, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 490 days.

(21) Appl. No.: 17/403,105

(22) Filed: Aug. 16, 2021

(65) Prior Publication Data

US 2022/0091017 A1 Mar. 24, 2022

Related U.S. Application Data

(60) Provisional application No. 63/081,660, filed on Sep. 22, 2020.

(51) Int. Cl.
*G01N 15/10* (2024.01)
*G01N 15/14* (2024.01)
(Continued)

(52) U.S. Cl.
CPC ..... *G01N 15/1012* (2013.01); *G01N 15/1429* (2013.01); *G01N 15/1459* (2013.01);
(Continued)

(58) Field of Classification Search
CPC ........... G01N 15/1012; G01N 15/1429; G01N 15/1459; G01N 21/6456; G01N 2015/1402; G01N 2015/149
See application file for complete search history.

(56) References Cited

U.S. PATENT DOCUMENTS 5,682,038 A * 10/1997 Hoffman ............. G01N 15/14
356/411
2013/0327957 A1* 12/2013 Ayliffe ............. B01L 3/502715
250/200

(Continued)

FOREIGN PATENT DOCUMENTS

WO WO2020119990 A1 6/2020

OTHER PUBLICATIONS

Murat Serhatlioglu, "Femtosecond laser fabrication of fiber based optofluidic platform for flow cytometry applications", Feb. 28, 2017, SPIE Digital Library, (Year: 2017).*

(Continued)

*Primary Examiner* — Catherine T. Rastovski
*Assistant Examiner* — Yossef Korang-Beheshti
(74) *Attorney, Agent, or Firm* — Khin K. Chin; Bret E. Field; BOZICEVIC, FIELD & FRANCIS LLP

(57) ABSTRACT

Aspects of the present disclosure include methods for determining baseline noise of a photodetector (e.g., in a light detection system of a particle analyzer). Methods according to certain embodiments include irradiating a sample having particles in a flow stream, detecting light with the photodetector from the irradiated flow stream, generating data signals from the detected light and calculating a moving average mean squared error of the generated data signals to determine the baseline of the photodetector. Systems (e.g., particle analyzers) having a light source and a light detection system that includes a photodetector for practicing the subject methods are also described. Integrated circuits and non-transitory computer readable storage medium are also provided.

18 Claims, 12 Drawing Sheets

(51) Int. Cl.
*G01N 15/1429* (2024.01)
*G01N 21/64* (2006.01)
*G01N 15/149* (2024.01)

(52) U.S. Cl.
CPC ... *G01N 2015/1402* (2013.01); *G01N 15/149* (2024.01); *G01N 21/6456* (2013.01)

(56) References Cited

U.S. PATENT DOCUMENTS

| | | | |
|---|---|---|---|
| 2014/0101327 A1* | 4/2014 | Maegawa | H04L 65/612 |
| | | | 709/236 |
| 2014/0356937 A1 | 12/2014 | Boudreau | |
| 2016/0231357 A1* | 8/2016 | Taratorin | G01R 13/0254 |
| 2019/0113437 A1 | 4/2019 | Guan | |
| 2020/0072727 A1 | 5/2020 | Lin et al. | |
| 2021/0118102 A1* | 4/2021 | Walter | G02B 21/244 |
| 2023/0120382 A1* | 4/2023 | Umetsu | G01N 15/1459 |
| | | | 702/19 |

OTHER PUBLICATIONS

David Basiji, "Multispectral imaging flow cytometry", Apr. 15, 2007, IEEE Xplore (Year: 2007).*

* cited by examiner

FIG. 2B (Cont.)

① UV 12-A
② UV 11-A
③ UV 10-A
④ UV 9-A
⑤ UV 8-A
⑥ UV 7-A
⑦ UV 6-A
⑧ UV 5-A
⑨ UV 4-A
⑩ UV 3-A
⑪ UV 2-A
⑫ UV 1-A
⑬ Violet 12-A
⑭ Violet 11-A
⑮ Violet 10-A
⑯ Violet 9-A
⑰ Violet 8-A
⑱ Violet 7-A
⑲ Violet 6-A
⑳ Violet 5-A
㉑ Violet 4-A ㉒ Violet 3-A
㉓ Violet 2-A
㉔ Violet 1-A
㉕ Blue 10-A
㉖ Blue 9-A
㉗ Blue 8-A
㉘ Blue 7-A
㉙ Blue 6-A
㉚ Blue 5-A
㉛ Blue 4-A
㉜ Blue 3-A
㉝ Blue 2-A
㉞ Blue 1-A
㉟ Green 8-A
㊱ Green 7-A
㊲ Green 6-A
㊳ Green 5-A
㊴ Green 4-A
㊵ Green 3-A
㊶ Green 2-A
㊷ Green 1-A ㊸ Red 6-A
㊹ Red 5-A
㊺ Red 4-A
㊻ Red 3-A
㊼ Red 2-A
㊽ Red 1-A

FIG. 2C (Cont.)

① UV 12-A
② UV 11-A
③ UV 10-A
④ UV 9-A
⑤ UV 8-A
⑥ UV 7-A
⑦ UV 6-A
⑧ UV 5-A
⑨ UV 4-A
⑩ UV 3-A
⑪ UV 2-A
⑫ UV 1-A
⑬ Violet 12-A
⑭ Violet 11-A
⑮ Violet 10-A
⑯ Violet 9-A
⑰ Violet 8-A
⑱ Violet 7-A
⑲ Violet 6-A
⑳ Violet 5-A
㉑ Violet 4-A ㉒ Violet 3-A
㉓ Violet 2-A
㉔ Violet 1-A
㉕ Blue 10-A
㉖ Blue 9-A
㉗ Blue 8-A
㉘ Blue 7-A
㉙ Blue 6-A
㉚ Blue 5-A
㉛ Blue 4-A
㉜ Blue 3-A
㉝ Blue 2-A
㉞ Blue 1-A
㉟ Green 8-A
㊱ Green 7-A
㊲ Green 6-A
㊳ Green 5-A
㊴ Green 4-A
㊵ Green 3-A
㊶ Green 2-A
㊷ Green 1-A ㊸ Red 6-A
㊹ Red 5-A
㊺ Red 4-A
㊻ Red 3-A
㊼ Red 2-A
㊽ Red 1-A

METHODS FOR CONTINUOUS MEASUREMENT OF BASELINE NOISE IN A FLOW CYTOMETER AND SYSTEMS FOR SAME

CROSS-REFERENCE TO RELATED APPLICATION

Pursuant to 35 U.S.C. § 119 (e), this application claims priority to the filing dates of U.S. Provisional Patent Application Ser. No. 63/081,660 filed Sep. 22, 2020, the disclosure of which application is incorporated herein by reference in their entirety.

INTRODUCTION

Light detection is often used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector.

One technique that utilizes light detection to characterize the components in a sample is flow cytometry. Using data generated from the detected light, distributions of the components can be recorded and where desired material may be sorted. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. Within the flow cell, a liquid sheath is formed around the cell stream to impart a substantially uniform velocity on the cell stream. The flow cell hydrodynamically focuses the cells within the stream to pass through the center of a light source in a flow cell. Light from the light source can be detected as scatter or by transmission spectroscopy or can be absorbed by one or more components in the sample and re-emitted as luminescence.

SUMMARY

Aspects of the present disclosure include methods for determining baseline noise of a photodetector (e.g., in a light detection system of a particle analyzer). Methods according to certain embodiments include irradiating a sample having particles in a flow stream, detecting light with the photodetector from the irradiated flow stream, generating data signals from the detected light and calculating a moving average mean squared error of the generated data signals to determine the baseline noise of the photodetector. Systems (e.g., particle analyzers) having a light source and a light detection system that includes a photodetector for practicing the subject methods are also described. Integrated circuits and non-transitory computer readable storage medium are also provided.

In practicing the subject methods, a sample having particles in a flow stream are irradiated and light from the flow stream is detected. The light detected from the flow stream may be scattered light (e.g., side scattered light or forward scattered light) or emitted light. In some embodiments, light detected according to the subject methods is emitted light. In certain embodiments, the sample includes one or more fluorophores and the light detected by the photodetector is fluorescent light. Data signals are generated by the photodetector from the detected light and a moving average mean squared error is calculated to determine the baseline noise of the photodetector. In some embodiments, light is detected from a particle-free component of the flow stream, such as for example light that is emanating between particles flowing in the flow stream. In some embodiments, a moving average of the mean squared error of the generated data signals is calculated over a time interval of 10 ms or more, such as over 50 ms or more, such as over 100 ms or more, such as over 250 ms or more and including calculating a moving average of the mean squared error of the generated data signals over a time interval of 500 ms or more.

In some embodiments, calculating the moving average mean squared error of the generated data signals includes measuring a squared difference between a generated data signal and a calculated baseline data signal. In certain instances, calculating the moving average mean squared error of the generated data signals includes measuring a squared difference between a plurality of generated data signals and a calculated baseline data signal over a predetermined sampling period to generate a plurality of baseline noise signals, summing the baseline noise signals over the sampling period and dividing the summed baseline noise signals by the number of the baseline noise signals generated over the predetermined sampling period. In some instances, the predetermined sampling period is a duration of from 0.001 µs to 100 µs. In other instances, the predetermined sampling period is a duration of from 1 µs to 10 µs. In certain embodiments, the subject methods include calculating the moving average mean squared error of the generated data signals at predetermined time intervals. For example, the moving average mean squared error of the generated data signals is calculated at a frequency of once every 1 ms or more, such as once every 5 ms or more, such as once every 10 ms or more, such as once every 25 ms or more, such as once every 50 ms or more, such as once every 100 ms or more and including once every 500 ms or more. In some embodiments, the moving average mean squared error of the generated data signals is calculated at a frequency of once every second to once every 60 seconds. In other embodiments, the moving average mean squared error of the generated data signals is calculated at a frequency of once every minute to once every 60 minutes. In certain embodiments, methods include continuously calculating the moving average mean squared error of the generated data signals.

In some embodiments, the sample includes a plurality of fluorophores, such as where the fluorophores have overlapping fluorescence spectra. In some instances, the fluorophores are functionally associated with particles of the sample. In certain instances, the flow stream includes one or more free fluorophores that are functionally unassociated with the particles of the sample (e.g., unbound fluorophores in the flow stream). In certain embodiments, methods include detecting light from the free fluorophores in the sample with the photodetector, generating data signals from the detected light and calculating a moving average mean squared error of the generated data signals from the light emanating from the free fluorophores in the sample. In some instances, the method further includes spectrally resolving the light from each type of fluorophore in the sample, such as by calculating a spectral unmixing matrix for the fluorescence spectra of each type of fluorophore in the sample.

In certain instances, the spectral unmixing matrix is calculated using a weighted least squares algorithm. In some embodiments, the generated data signals from the light from the free fluorophores in the sample are weighted based on the determined baseline noise of the photodetector. In certain embodiments, the baseline noise of the photodetector is determined using an integrated circuit, such as a field programmable gated array. In other embodiments, the spectral unmixing matrix is calculated with a weighted least squares algorithm on the integrated circuit.

Aspects of the present disclosure also include systems (e.g., particle analyzer) for practicing the subject methods, where systems of interest have a light source and a light detection system that includes a photodetector. In some embodiments, light detection systems include one or more photodetectors for detecting light from an irradiated flow stream, such as 2 or more photodetectors, such as 5 or more photodetectors, such as 10 or more photodetectors, such as 25 or more photodetectors, such as 50 or more photodetectors, such as 100 or more photodetectors and including 1000 or more photodetectors. In some embodiments, systems include a processor having memory operably coupled to the processor where the memory includes instructions stored thereon, which when executed by the processor, cause the processor to generate data signals from light from particles in an irradiated flow stream and calculate a moving average mean squared error of the generated data signals to determine a baseline noise of the photodetector. In some embodiments, the memory includes instructions which when executed by the processor, cause the processor to calculate the moving average mean squared error of the generated data signals by measuring a squared difference between a generated data signal and a calculated baseline data signal. In certain embodiments, the memory includes instructions for measuring a squared difference between a plurality of generated data signals and calculating baseline data signal over a predetermined sampling period to generate a plurality of baseline noise signals, summing the baseline noise signals over the sampling period and dividing the summed baseline noise signals by the number of the baseline noise signals generated over the predetermined sampling period. In some instances, the predetermined sampling period is a duration of from 0.001 μs to 100 μs. In other instances, the predetermined sampling period is a duration of from 1 μs to 10 μs.

In some embodiments, the memory includes instructions which when executed by the processor, cause the processor to calculate the moving average mean squared error of the generated data signals at predetermined time intervals. In other embodiments, the memory includes instructions which when executed by the processor, cause the processor to calculate the moving average mean squared error of the generated data signals at a frequency of once every millisecond to once every 1000 milliseconds. For example, the memory includes instructions for calculating the moving average mean squared error of the generated data signals at a frequency of once every 1 ms or more, such as once every 5 ms or more, such as once every 10 ms or more, such as once every 25 ms or more, such as once every 50 ms or more, such as once every 100 ms or more and including once every 500 ms or more. In some embodiments, the memory includes instructions for calculating the moving average mean squared error of the generated data signals at a frequency of once every second to once every 60 seconds. In other embodiments, the memory includes instructions for calculating the moving average mean squared error of the generated data signals at a frequency of once every minute to once every 60 minutes. In certain embodiments, the memory includes instructions for continuously calculating the moving average mean squared error of the generated data signals.

In certain embodiments, systems include a processor having memory operably coupled to the processor where the memory includes instructions stored thereon, which when executed by the processor, cause the processor to detect light from the free fluorophores in the sample with the photodetector, generate data signals from the detected light and calculate a moving average mean squared error of the generated data signals from the light emanating from the free fluorophores in the sample. In some instances, the memory includes instructions for spectrally resolving the light from each type of fluorophore in the sample. In certain instances, the memory includes instructions for resolving the light from each type of fluorophore by calculating a spectral unmixing matrix for the fluorescence spectra of each type of fluorophore in the sample. In certain instances, the memory includes instructions for calculating the spectral unmixing matrix by using a weighted least squares algorithm. In some embodiments, the generated data signals from the light from the free fluorophores in the sample are weighted based on the determined baseline noise of the photodetector. In certain embodiments, systems include an integrated circuit such as a field programmable gate array.

Aspects of the present disclosure also include integrated circuits programmed to calculate a moving average mean squared error of data signals generated from light detected from irradiated particles of a sample in a flow stream. In some instances, the integrated circuit is a field programmable gated array. In other instances, the integrated circuit is an application specific integrated circuit. In still other instances, the integrated circuit is a complex programmable logic device.

In some embodiments, the integrated circuit is programmed to calculate the moving average mean squared error of the generated data signals by measuring a squared difference between a generated data signal and a calculated baseline data signal. In certain embodiments, the integrated circuit is programmed to measure a squared difference between a plurality of generated data signals and a calculated baseline data signal over a predetermined sampling period to generate a plurality of baseline noise signals, sum the baseline noise signals over the sampling period and divide the summed baseline noise signals by the number of the baseline noise signals generated over the predetermined sampling period. In some instances, the predetermined sampling period is a duration of from 0.001 μs to 100 μs. In other instances, the predetermined sampling period is a duration of from 1 μs to 10 μs.

In some embodiments, integrated circuits of the present disclosure are programmed to calculate the moving average mean squared error of the generated data signals at predetermined time intervals. In some instances, the integrated circuit is programmed to calculate the moving average mean squared error of the generated data signals at a frequency of once every millisecond to once every 1000 milliseconds. For example, the integrated circuit may be programmed to calculate the moving average mean squared error of the generated data signals at a frequency of once every 1 ms or more, such as once every 5 ms or more, such as once every 10 ms or more, such as once every 25 ms or more, such as once every 50 ms or more, such as once every 100 ms or more and including once every 500 ms or more. In other embodiments, the integrated circuit is programmed to calculate the moving average mean squared error of the generated data signals at a frequency of once every second to once every 60 seconds. In still other embodiments, the integrated circuit is programmed to calculate the moving average mean squared error of the generated data signals at a frequency of once every minute to once every 60 minutes. In certain embodiments, the integrated circuit is programmed to continuously calculate the moving average mean squared error of the generated data signals.

In certain embodiments, the integrated circuit is programmed to detect with the photodetector light from the free fluorophores in the sample with the photodetector, generate data signals from the detected light and calculate a moving average mean squared error of the generated data signals from the light emanating from the free fluorophores in the sample. In some instances, the integrated circuit is programmed to spectrally resolve the light from each type of fluorophore in the sample. In certain instances, the integrated circuit is programmed to resolve light from each type of fluorophore by calculating a spectral unmixing matrix for the fluorescence spectra of each type of fluorophore in the sample. In certain instances, the integrated circuit is programmed to calculate the spectral unmixing matrix by using a weighted least squares algorithm. In some embodiments, the integrated circuit is programmed to weight the generated data signals from the light from the free fluorophores in the sample based on the determined baseline noise of the photodetector.

Aspects of the present disclosure also include non-transitory computer readable storage medium having instructions stored thereon for determining baseline noise of a photodetector of a light detection system of a particle analyzer. In some embodiments, the non-transitory computer readable storage medium includes algorithm for calculating a moving average mean squared error of data signals generated from light detected from irradiated particles of a sample in a flow stream. In some embodiments, the non-transitory computer readable storage medium includes algorithm for calculating the moving average mean squared error of the generated data signals by measuring a squared difference between a generated data signal and a calculated baseline data signal. In certain embodiments, the non-transitory computer readable storage medium includes algorithm for measuring a squared difference between a plurality of generated data signals and a calculated baseline data signal over a predetermined sampling period to generate a plurality of baseline noise signals, algorithm for summing the baseline noise signals over the sampling period and dividing the summed baseline noise signals by the number of the baseline noise signals generated over the predetermined sampling period. In some instances, the predetermined sampling period is a duration of from 0.001 µs to 100 µs. In other instances, the predetermined sampling period is a duration of from 1 µs to 10 µs.

In some embodiments, the non-transitory computer readable storage medium includes algorithm for calculating the moving average mean squared error of the generated data signals at predetermined time intervals. In some instances, the non-transitory computer readable storage medium includes algorithm for calculating the moving average mean squared error of the generated data signals at a frequency of once every millisecond to once every 1000 milliseconds. For example, the non-transitory computer readable storage medium may include algorithm for calculating the moving average mean squared error of the generated data signals at a frequency of once every 1 ms or more, such as once every 5 ms or more, such as once every 10 ms or more, such as once every 25 ms or more, such as once every 50 ms or more, such as once every 100 ms or more and including once every 500 ms or more. In other embodiments, the non-transitory computer readable storage medium includes algorithm for calculating the moving average mean squared error of the generated data signals at a frequency of once every second to once every 60 seconds. In still other embodiments, the non-transitory computer readable storage medium includes algorithm for calculating the moving average mean squared error of the generated data signals at a frequency of once every minute to once every 60 minutes. In certain embodiments, the non-transitory computer readable storage medium includes algorithm for continuously calculating the moving average mean squared error of the generated data signals.

In certain embodiments, the non-transitory computer readable storage medium includes algorithm for detecting with the photodetector light from the free fluorophores in the sample with the photodetector, algorithm for generating data signals from the detected light and algorithm for calculating a moving average mean squared error of the generated data signals from the light emanating from the free fluorophores in the sample. In some instances, the non-transitory computer readable storage medium includes algorithm for spectrally resolving the light from each type of fluorophore in the sample. In certain instances, the non-transitory computer readable storage medium includes algorithm for resolving light from each type of fluorophore by calculating a spectral unmixing matrix for the fluorescence spectra of each type of fluorophore in the sample. In certain instances, the non-transitory computer readable storage medium includes algorithm for calculating the spectral unmixing matrix by using a weighted least squares algorithm. In some embodiments, the non-transitory computer readable storage medium includes algorithm for weighting the generated data signals from the light from the free fluorophores in the sample based on the determined baseline noise of the photodetector.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
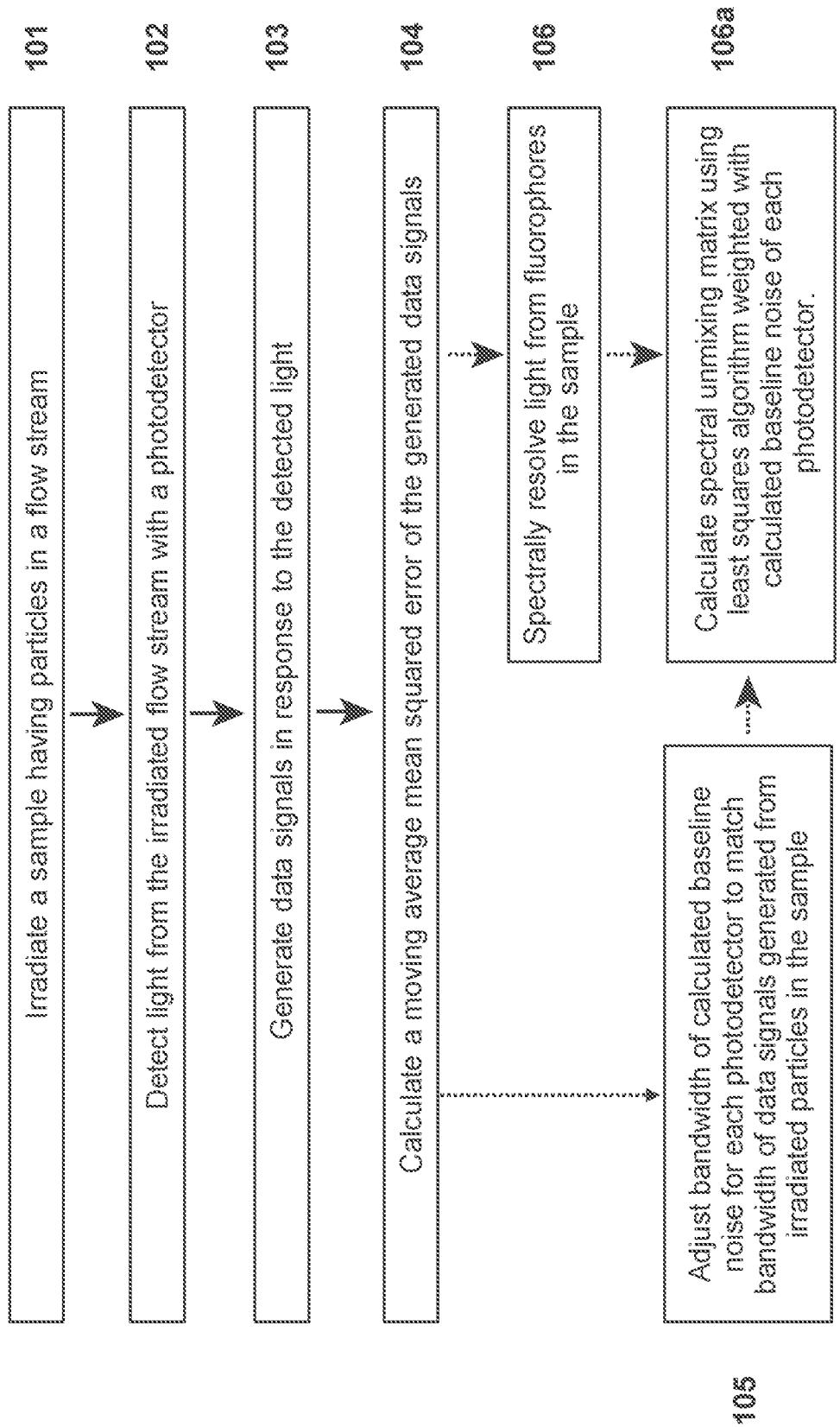
FIG. 1 depicts a flow diagram for measuring baseline noise of a photodetector according to certain embodiments.

Aspects of the present disclosure include methods for determining baseline noise of a photodetector (e.g., in a light detection system of a particle analyzer). Methods according to certain embodiments include irradiating a sample having particles in a flow stream, detecting light with the photodetector from the irradiated flow stream, generating data signals from the detected light and calculating a moving average mean squared error of the generated data signals to determine the baseline of the photodetector. Systems (e.g., particle analyzers) having a light source and a light detection system that includes a photodetector for practicing the subject methods are also described. Integrated circuits and non-transitory computer readable storage medium are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides methods for determining baseline noise of a photodetector (e.g., in a light detection system of a particle analyzer). In further describing embodiments of the disclosure, methods for determining baseline noise by irradiating a sample having particles in a flow stream, detecting light with the photodetector from the irradiated flow stream, generating data signals from the detected light and calculating a moving average mean squared error of the generated data signals are first described in greater detail. Next, systems that include a light source and a light detection system having a photodetector for practicing the subject methods are described. Integrated circuits and non-transitory computer readable storage medium are also provided.

Methods for Measuring Baseline Noise of a Photodetector in a Light Detection System Aspects of the present disclosure include methods for determining the baseline noise of a photodetector in a light detection system (e.g., in a particle analyzer of a flow cytometer). In some embodiments, methods for determining the baseline noise of a photodetector provide for real-time measurements of the baseline noise, such as during the irradiation of a sample in a flow stream. As described in greater detail below, the subject methods provide for sample-specific measurements of baseline noise. Obtaining real-time, sample-specific measurements of the baseline noise according to embodiments of the present disclosure provide for determining contributions to background noise of each individual photodetector in a light detection system, such as contributions from time-varying parameters which include, but are not limited to, drift in laser focus, drift in laser alignment, time-dependent changes in flow rate and flow profile of the flow stream, as well as increases in electronic noise due to thermal drift of detector components such as transimpedance amplifiers. In certain embodiments, the subject methods provide for an increased signal-to-noise ratio in data signals from the photodetector, such as where the signal-to-noise ratio of the photodetector is increased by 5% or more, such as by 10% or more, such as by 25% or more, such as by 50% or more, such as by 75% or more, such as by 90% or more and including by 99% or more. In certain instances, the subject methods increase the photodetector signal-to-noise ratio by 2-fold or more, such as by 3-fold or more, such as by 4-fold or more, such as by 5-fold or more and including by 10-fold or more.

In practicing the subject methods, baseline noise from a photodetector is calculated. The term "baseline noise" is used herein in its conventional sense to refer to the baseline electronic signals from the photodetector (e.g., electronic signals that originate from the operating electronic components of the photodetector or optical components of the light detection system). In certain instances, baseline noise includes electronic signals present in the light detection system, such as those generated by a light source or other electronic sub-components of the system. In other embodiments, the baseline noise includes electronic signals that result from vibrational or thermal effects from components of the system. In yet other embodiments, baseline noise includes optical signals, such as light from an irradiation source in the system (e.g., from one or more lasers present in a flow cytometer).

In practicing the subject methods, a flow stream is irradiated with a light source and light from the flow stream is detected with a light detection system having one or more photodetectors. In some embodiments, a sample having particles in the flow stream is irradiated. In certain embodiments, the sample is a biological sample. In embodiments, the flow stream (e.g., with a sample having particles flowing therethrough) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The flow stream (e.g., with a sample having flowing particles) may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the flow stream with an array of lasers, such as an array having one or more gas lasers, one or more dye lasers and one or more solid-state lasers.

The flow stream may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the flow stream may be irradiated with the light sources simultaneously or sequentially, or a combination thereof. For example, the flow stream may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where flow stream is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where flow stream is sequentially irradiated by more than two (i.e., 3 or more) light sources, the delay between irradiation by each light source may be the same or different.

The flow stream may be irradiated continuously or in discrete intervals. In some instances, methods include irradiating the flow stream (e.g., with sample having particles) with the light source continuously. In other instances, the flow stream in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the flow stream may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In certain embodiments, methods include irradiating a sample having particles in a flow stream with two or more beams of frequency shifted light. As described above, a light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In these embodiments, the angularly deflected laser beams in the output laser beam are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

As discussed above, in embodiments light from the irradiated sample is conveyed to a light detection system (described in greater detail below) and measured by one or more photodetectors. In some embodiments, methods include measuring the collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of fluorophores. In some embodiments, methods include measuring collected light across the entire fluorescence spectrum of each fluorophore in the sample.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

In embodiments, data signals from the photodetector are generated in response to light from the flow stream. In some embodiments, light is detected from a particle-free component of the irradiated flow stream. By light from a "particle-free" component is meant the light from the flow stream that does not emanate from the irradiated particles (e.g., of the sample), such as scattered light or emitted light, for example fluorescence from one or more fluorophores which are conjugated to or physically associated with the particles. In some embodiments, light emanating from a particle-free component of the flow stream is fluorescent light from free fluorophores in the sample. The term "free fluorophores" is meant fluorophores that are not associated with a particle in the flow stream, such as fluorophores which are conjugated (i.e., covalently bonded) to or physically associated (e.g., hydrogen bonding, ionic interactions) with the particles. Where methods include detecting light from a particle-free component of the irradiated flow stream, data signals may be generated from a sampling period having a duration of from 0.001 μs to 100 μs, such as from 0.005 μs to 95 μs, such as from 0.01 μs to 90 μs, such as from 0.05 μs to 85 μs, such as from 0.1 μs to 80 μs, such as from 0.5 μs to 75 μs, such as from 1 μs to 70 μs, such as from 2 μs to 65 μs, such as from 3 μs to 60 μs, such as from 4 μs to 55 μs and including from 5 μs to 50 μs. In certain instances, data signals are generated from light detected from the particle-free component of the irradiated flow stream over a sampling period having a duration of from 1 μs to 10 μs.

In practicing the subject methods, a moving average mean squared error of generated data signals is calculated. In some embodiments, the moving average mean squared error is calculated by measuring a squared difference between a generated data signal and a calculated baseline data signal. In certain instances, calculating the moving average mean squared error of the generated data signals includes measuring a squared difference between a plurality of generated data signals and a calculated baseline data signal over a predetermined sampling period to generate a plurality of baseline noise signals, summing the baseline noise signals over the sampling period and dividing the summed baseline noise signals by the number of the baseline noise signals generated over the predetermined sampling period. In some instances, the predetermined sampling period is a duration of from 0.001 μs to 100 μs, such as from 0.005 μs to 95 μs, such as from 0.01 μs to 90 μs, such as from 0.05 μs to 85 μs, such as from 0.1 μs to 80 μs, such as from 0.5 μs to 75 μs, such as from 1 μs to 70 μs, such as from 2 μs to 65 μs, such as from 3 μs to 60 μs, such as from 4 μs to 55 μs and including from 5 μs to 50 μs.

In certain embodiments, the subject methods include calculating the moving average mean squared error of the generated data signals at predetermined time intervals. For example, the moving average mean squared error of the generated data signals is calculated at a frequency of once every 0.0001 ms or more, such as once every 0.0005 ms or more, such as once every 0.001 ms or more, such as once every 0.005 ms or more, such as once every 0.01 ms or more, such as once every 0.05 ms or more, such as once every 0.1 ms or more, such as once every 0.5 ms or more, such as once every 1 ms or more, such as once every 1 ms or more, such as once every 2 ms or more, such as once every 3 ms or more, such as once every 4 ms or more, such as once every 5 ms or more, such as once every 10 ms or more, such as once every 25 ms or more, such as once every 50 ms or more, such as once every 100 ms or more and including once every 500 ms or more. In some embodiments, the moving average mean squared error of the generated data signals is calculated at a frequency of once every second, such as once every 2 seconds, such as once every 3 seconds, such as once every 4 seconds, such as once every 5 seconds, such as once every 10 seconds, such as once every 15 seconds, such as once every 30 seconds and including once every 60 seconds. In other embodiments, the moving average mean squared error of the generated data signals is calculated at a frequency of once every minute such as once every 2 minutes, such as once every 3 minutes, such as once every 4 minutes, such as once every 5 minutes, such as once every 10 minutes, such as once every 15 minutes, such as once every 30 minutes and including once every 60 minutes. In certain embodiments, methods include continuously calculating the moving average mean squared error of the generated data signals.

In certain embodiments, methods include continuously computing and updating the mean squared error of the baseline noise signal over a sampling window. For example, the duration of the sampling window may be from 1 μs or more, such as 10 μs or more, such as 25 μs or more, such as 50 μs or more, such as 100 μs or more, such as 500 μs or more, such as 1 ms or more, such as 10 ms or more, such as 25 ms or more, such as 50 ms or more, such as 100 ms or more, such as 500 ms or more, such as 1 second or more, such as 5 seconds or more, such as 10 seconds or more, such as 25 seconds or more, such as 50 seconds or more, such as 100 seconds or more and including over a sampling window duration of 500 seconds or more. In these embodiments, the mean-squared error may be calculated over all or part of the sampling window duration, such as 5% or more of the duration of the sampling window, such as 10% or more, such as 15% or more, such as 25% or more, such as 50% or more, such as 75% or more, such as 90% or more, such as 95% or more, such as 97% or more and including over 99% or more of the sampling window duration. In certain embodiments, the mean-squared error is continuously calculated over the entire (100%) sampling window duration.

In some embodiments, the baseline noise of each photodetector is measured as the square of the difference between a current sample value and a calculated baseline. In some instances, the baseline noise in these embodiments is sampled every 2^baseline sample interval clocks over a 2^baseline window size clocks and accumulated. The sum of the baseline noise sample is then divided by the number of noise samples accumulated to get the mean squared baseline noise measurement. In certain embodiments, an approximated average of this value is used for each sample, such as where for each sample the sum of the squared noise is continuously updated according to embodiments of the present disclosure as: (current sum)−(current average)+(new baseline noise squared sample). In certain embodiments, baseline sampling is periodically updated over the course of data acquisition, such as with a frequency of once every 1 μs or more, such as once every 10 μs or more, such as once every 25 μs or more, such as once every 50 μs or more, such as once every 100 μs or more, such as once every 500 μs or more, such as once every 1 ms or more, such as once every 10 ms or more, such as once every 25 ms or more, such as once every 50 ms or more, such as once every 100 ms or more, such as once every 500 ms or more, such as once every 1 second or more, such as once every 5 seconds or more, such as once every 10 seconds or more, such as once every 25 seconds or more, such as once every 50 seconds or more, such as once every 100 seconds or more and including updating the baseline sampling once every 500 seconds or more.

In certain embodiments, the baseline noise of each photodetector is updated (i.e., calculated according to the subject methods) at a predetermined time period before light is detected from a particle in the sample (e.g., determining baseline noise of the photodetector just before a particle in the sample is irradiated with light). For example, in some instances the baseline noise of each photodetector is updated immediately before generating a data signal from light detected from a particle in the sample. In other instances, the baseline noise of each photodetector is updated from 0.0001 μs to 500 μs before generating a data signal from light detected from a particle in the sample, such as from 0.0005 μs to 450 μs, such as from 0.001 μs to 400 μs, such as from 0.005 μs to 350 μs, such as from 0.01 μs to 300 μs, such as from 0.05 μs to 250 μs, such as from 0.1 μs to 200 μs, such as from 0.5 μs to 150 μs and including updating the baseline noise of each photodetector from 1 μs to 100 μs before generating a data signal from light detected from a particle in the sample.

FIG. 1 depicts a flow diagram for measuring baseline noise of a photodetector according to certain embodiments. At step 101, a sample having particles is irradiated in a flow stream. Light from the irradiated flow stream is detected with a photodetector at step 102 and data signals are generated in response to the detected light by each photodetector at step 103. The baseline noise of each photodetector is determined at step 104 by calculating a moving average mean squared error of the generate data signals. In some embodiments, light from fluorophores in the sample is spectrally resolved at steps 106 and 106a by calculating a spectral unmixing matrix using a least squares algorithm. In some instances, the spectral unmixing matrix is calculated by weighting the least squares algorithm with the calculated baseline noise of each photodetector. In certain instances, the bandwidth of the baseline noise is adjusted at step 105 to match the bandwidth of the data signals generated by irradiating particles in the sample.

In certain embodiments, methods include adjusting the bandwidth of the calculated baseline noise for each photodetector. In some instances, adjusting the bandwidth of the calculated baseline noise includes increasing the bandwidth, such as by 5% or more, such as by 10% or more, such as by 15% or more, such as by 25% or more, such as by 50% or more, such as by 75% or more, such as by 90% or more including increasing the bandwidth of the calculated baseline noise by 99% or more. For example, the bandwidth of the calculated baseline noise may be increased by 0.0001 μs or more, such as by 0.0005 μs or more, such as by 0.001 μs or more, such as by 0.005 μs or more, such as by 0.01 μs or more, such as by 0.05 μs or more, such as by 0.1 μs or more, such as by 0.5 μs or more, such as by 1 μs or more, such as by 2 μs or more, such as by 3 μs or more, such as by 4 μs or more, such as by 5 μs or more, such as by 10 μs or more, such as by 25 μs or more, such as by 50 μs or more and including by increasing the bandwidth of the calculated baseline noise by 100 μs or more. In other instances, adjusting the bandwidth of the calculated baseline noise includes decreasing the bandwidth, such as by 5% or more, such as by 10% or more, such as by 15% or more, such as by 25% or more, such as by 50% or more, such as by 75% or more, such as by 90% or more including decreasing the bandwidth of the calculated baseline noise by 99% or more. For example, the bandwidth of the calculated baseline noise may be decreased by 0.0001 μs or more, such as by 0.0005 μs or more, such as by 0.001 μs or more, such as by 0.005 μs or more, such as by 0.01 μs or more, such as by 0.05 μs or more, such as by 0.1 μs or more, such as by 0.5 μs or more, such as by 1 μs or more, such as by 2 μs or more, such as by 3 μs or more, such as by 4 μs or more, such as by 5 μs or more, such as by 10 μs or more, such as by 25 μs or more, such as by 50 μs or more and including by decreasing the bandwidth of the calculated baseline noise by 100 μs or more. In certain embodiments, methods include matching the bandwidth of the calculated baseline noise with the bandwidth of data signals generated from particles in the sample. For example, the bandwidth of the calculated baseline noise may be adjusted to be 50% or more of the bandwidth of data signals generated from particles in the sample, such as 60% or more, such as 70% or more, such as 80% or more, such as 90% or more, such as 95% or more, such as 97% or more, such as 99% or more and including where the bandwidth of the calculated baseline noise is adjusted to be 99.9% or more of the bandwidth of data signals generated from particles in the sample. In certain embodiments, the bandwidth of the calculated baseline noise is matched (100%) to the bandwidth of data signals generated from particles in the sample.

In some embodiments, the sample includes a plurality of fluorophores, where one or more of the fluorophores have overlapping fluorescence spectra. In some instances, the method further includes spectrally resolving the light from each type of fluorophore in the sample, such as by calculating a spectral unmixing matrix for the fluorescence spectra of each type of fluorophore in the sample. In certain embodiments, methods include determining the overlap of the spectra of light from the flow stream and calculating the contribution of each to the overlapping detected light spectra. In certain embodiments, methods include calculating a spectral unmixing matrix to estimate the abundance of each contribution to the detected light signal by the photodetectors. In certain instances, the spectral unmixing matrix is calculated using a weighted least squares algorithm. In some embodiments, the generated data signals from the light from the free fluorophores in the sample are weighted based on the calculated baseline noise of the photodetector.

In certain embodiments, methods include spectrally resolving light (e.g., weighted using the calculated baseline noise of each photodetector) detected by the plurality of photodetectors such as described e.g., in International Patent Application No. PCT/US2019/068395 filed on Dec. 23, 2019; U.S. Provisional Patent Application No. 62/971,840 filed on Feb. 7, 2020 and U.S. Provisional Patent Application No. 63/010,890 filed on Apr. 16, 2020, the disclosures of which are herein incorporated by reference in their entirety. For example, spectrally resolving light detected by the plurality of photodetectors may be include solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

Figure 2A:
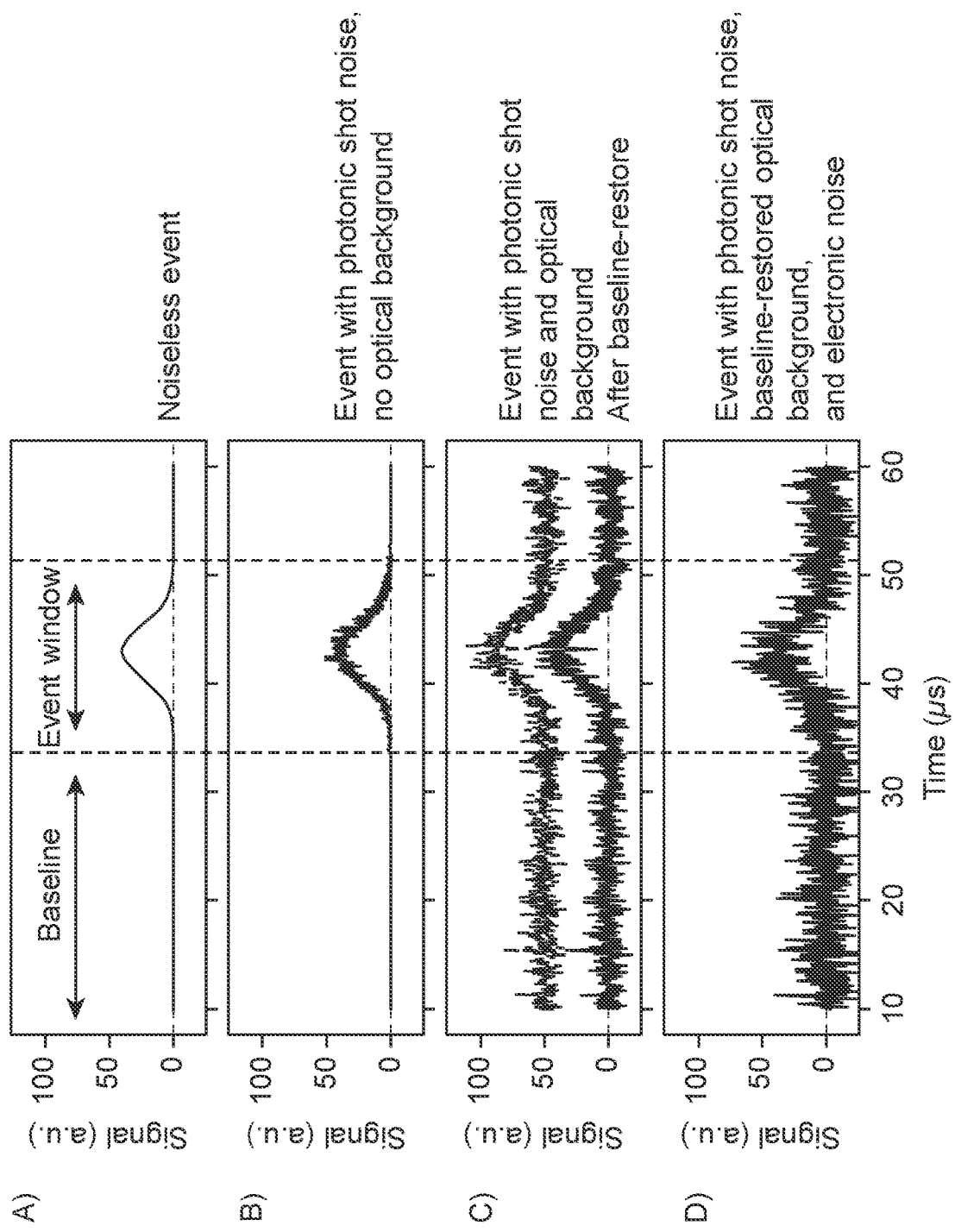
FIG. 2A depicts an illustration of baseline noise detected from an irradiated sample having particles in a flow stream according to certain embodiments.

FIG. 2A depicts an illustration of baseline noise detected from an irradiated sample having particles in a flow stream according to certain embodiments. Panel A of FIG. 2 depicts a data signal from an irradiated particle in the absence of baseline noise (e.g., drift in laser focus, drift in laser alignment, time-dependent changes in flow rate and flow profile of the flow stream, electronic noise due to thermal drift of detector components such as transimpedance amplifiers). Panel B of FIG. 2 depicts a data signal from an irradiated particle in the presence of photonic shot noise without optical background noise. Panel C of FIG. 2 depicts a data signal from an irradiated particle in the presence of photonic shot noise with optical background noise. Panel C also depicts the data signal from the irradiated particle after baseline restoring the data signal. Panel D of FIG. 2 depicts a data signal from the irradiated particle that has been baseline restored that is in the presence of photonic shot noise and electronic noise.

Figure 2B:
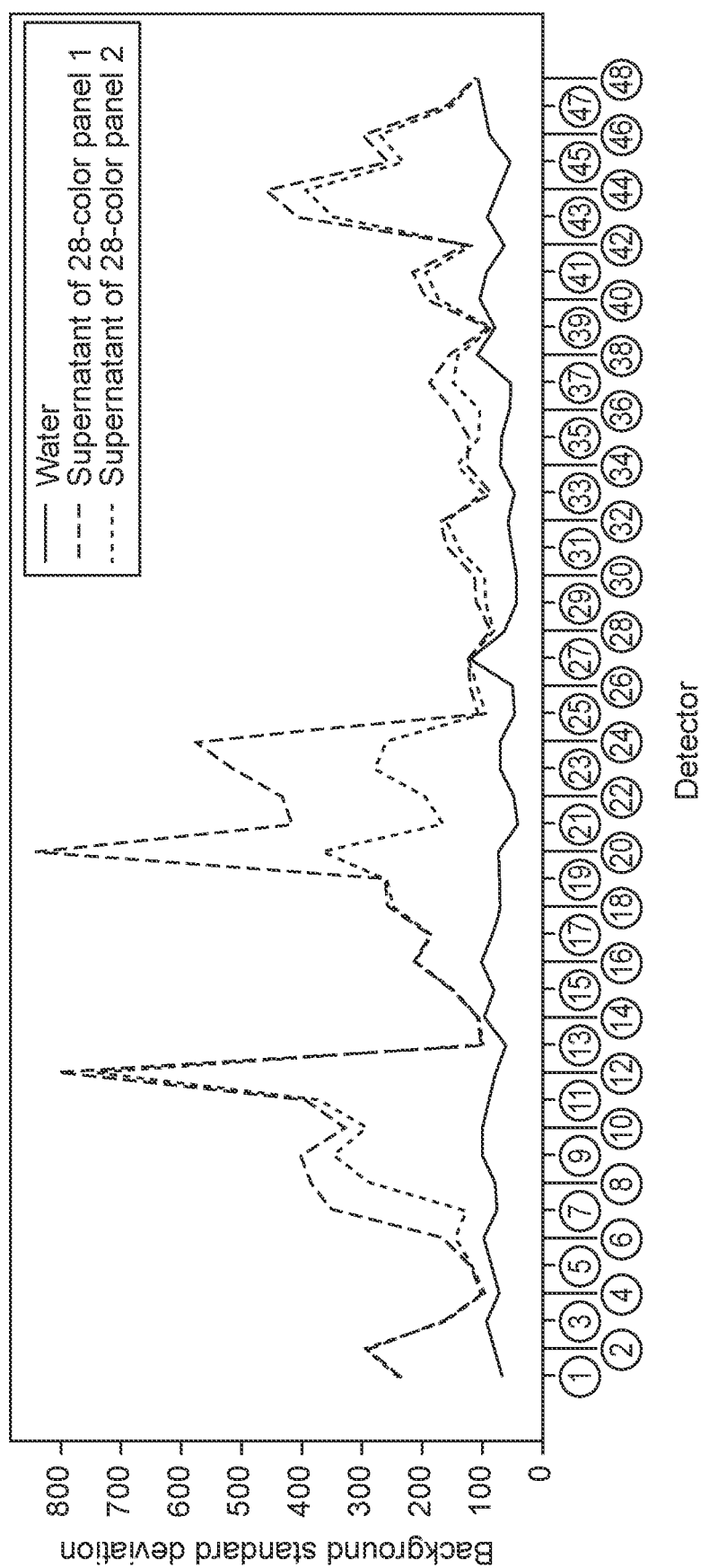
FIG. 2B depicts the baseline noise determined from samples having free fluorophores according to certain embodiments.
Figure 2C:
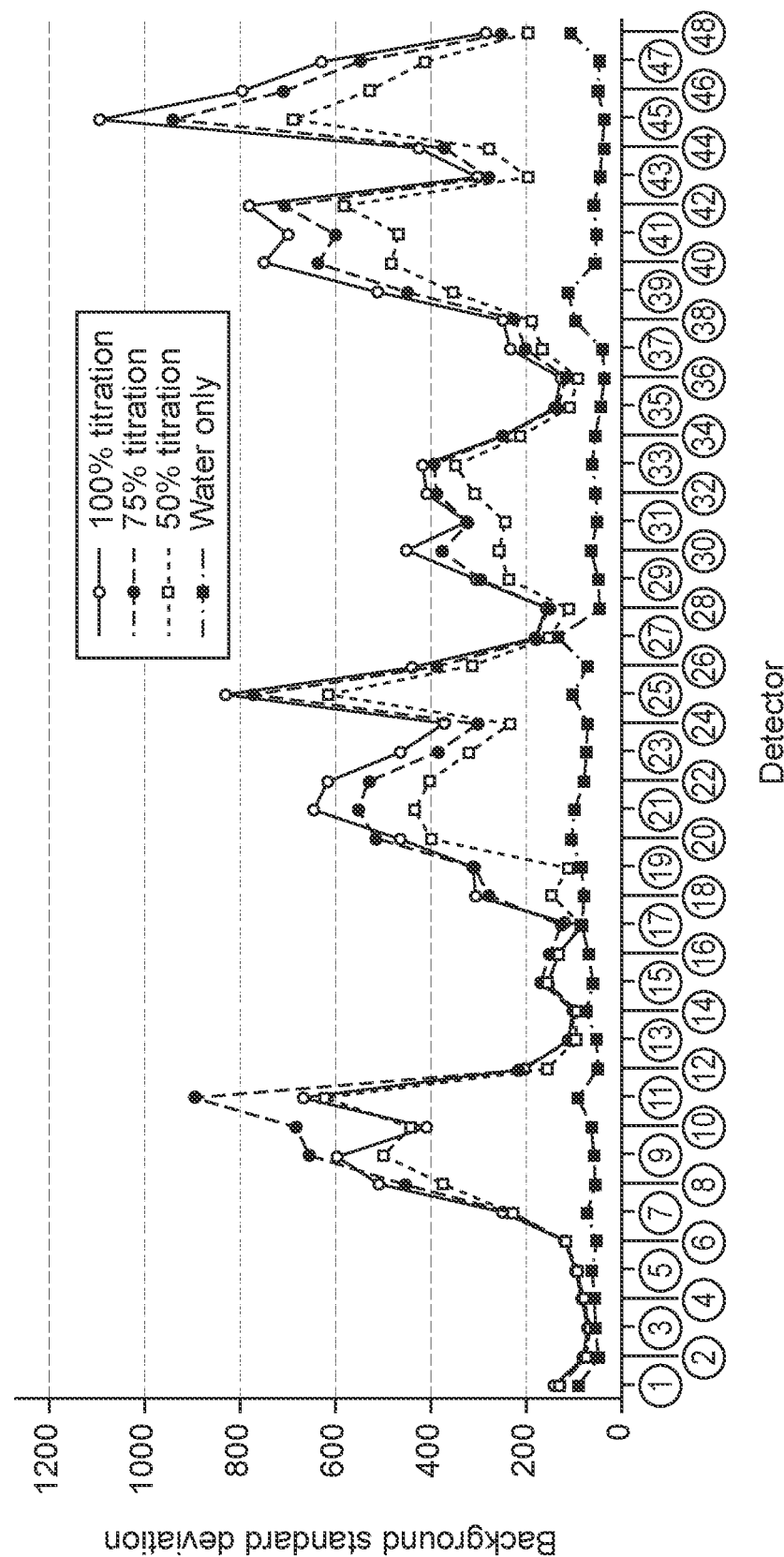
FIG. 2C depicts the baseline noise determined from samples with fluorophores titrated to different concentrations according to certain embodiments.

FIG. 2B depicts the baseline noise determined from samples having free fluorophores according to certain embodiments. Two samples (color panel 1 and color panel 2) having stained bone marrow cells were centrifuged to remove cells leaving behind only supernatant that contained free fluorophore. The samples include 28 different fluorophores. The background baseline noise from the free fluorophores in each sample was measured and plotted against a sample containing only water as a control. FIG. 2C depicts the baseline noise determined from samples with fluorophores titrated to different concentrations according to certain embodiments. A sample panel stained on cells at 100%, 75% and 50% antibody titrations is irradiated and baseline noise levels were determined for each sample panel. As shown in FIG. 2C, the baseline noise levels depend on the levels of free fluorophore in each sample.

In embodiments, the sample in the flow stream includes particles. In some embodiments, the sample is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, or other biological liquid sample, e.g., tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While embodiments of the present disclosure may be applied to samples from a human subject, it is to be understood that the methods may also be carried-out on samples from other animal subjects (that is, in "non-human subjects") such as, but not limited to, birds, mice, rats, dogs, cats, livestock and horses.

In certain embodiments, the biological sample contains cells. Cells that may be present in the sample include eukaryotic cells (e.g., mammalian cells) and/or prokaryotic cells (e.g., bacterial cells or archaeal cells). Samples may be obtained from an in vitro source (e.g., a suspension of cells from laboratory cells grown in culture) or from an in vivo source (e.g., a mammalian subject, a human subject, etc.). In some embodiments, the cellular sample is obtained from an in vitro source. In vitro sources include, but are not limited to, prokaryotic (e.g., bacterial, archaeal) cell cultures, environmental samples that contain prokaryotic and/or eukaryotic (e.g., mammalian, protest, fungal, etc.) cells, eukaryotic cell cultures (e.g., cultures of established cell lines, cultures of known or purchased cell lines, cultures of immortalized cell lines, cultures of primary cells, cultures of laboratory yeast, etc.), tissue cultures, and the like.

Where the biological sample includes cells, methods of the present disclosure may include characterizing components of the cells, such as cell fragments, fragmented cell membranes, organelles, dead or lysed cells. In some embodiments, methods include characterizing the extracellular vesicles of the cells. Characterizing the extracellular vesicles of the cells may include identifying the type of extracellular vesicles in the cells or determining the size of the extracellular vesicles in the cells.

In some embodiments, methods further include sorting one or more particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers. For example, methods may include sorting samples having 2 or more components, such as 3 or more components, such as 4 or more components, such as 5 or more components, such as 10 or more components, such as 15 or more components and including soring a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

In some embodiments, methods for sorting components of a sample include sorting particles (e.g., cells in a biological sample), such as described in U.S. Pat. Nos. 3,960,449; 4,347,935; 4,667,830; 5,245,318; 5,464,581; 5,483,469; 5,602,039; 5,643,796; 5,700,692; 6,372,506 and 6,809,804, the disclosures of which are herein incorporated by reference. In some embodiments, methods include sorting components of the sample with a particle sorting module, such as those described in U.S. Pat. Nos. 9,551,643 and 10,324,019, U.S. Patent Publication No. 2017/0299493 and International Patent Publication No. WO/2017/040151, the disclosure of which is incorporated herein by reference. In certain embodiments, cells of the sample are sorted using a sort decision module having a plurality of sort decision units, such as those described in U.S. patent application Ser. No. 16/725,756, filed on Dec. 23, 2019, the disclosure of which is incorporated herein by reference.

Systems for Measuring Baseline Noise of a Photodetector

Aspects of the present disclosure also include systems (e.g., particle analyzer) for practicing the subject methods, where systems of interest have a light source and a light detection system that includes a photodetector. In embodiments, systems include a processor having memory operably coupled to the processor where the memory includes instructions stored thereon, which when executed by the processor, cause the processor to generate data signals from light detected by the photodetector and calculate a moving average mean squared error of the generated data signals to determine a baseline noise of the photodetector. In some embodiments, the subject systems are configured for determining real-time measurements of baseline noise of the photodetector, such as during the irradiation of a sample in a flow stream. In some embodiments, systems are configured to obtain real-time, sample-specific measurements of the baseline noise. In certain embodiments, systems include memory having instructions stored thereon, which when executed by the processor, cause the processor to determine contributions to background noise of each individual photodetector in a light detection system, such as contributions from time-varying parameters which include, but are not limited to, drift in laser focus, drift in laser alignment, time-dependent changes in flow rate and flow profile of the flow stream, as well as increases in electronic noise due to thermal drift of detector components such as transimpedance amplifiers. As described above, the term baseline noise refers to the baseline electronic signals from the photodetector (e.g., electronic signals that originate from the operating electronic components of the photodetector or optical components of the light detection system). In certain instances, baseline noise includes electronic signals present in the light detection system, such as those generated by a light source or other electronic sub-components of the system. In other embodiments, the baseline noise includes electronic signals that result from vibrational or thermal effects from components of the system. In yet other embodiments, baseline noise includes optical signals, such as light from an irradiation source in the system (e.g., from one or more lasers present in a flow cytometer).

In embodiments, systems include a light source for irradiating a flow stream (e.g., a flow stream propagating a fluidic sample composition having particles). The light source may be any convenient light source and may include laser and non-laser light sources. In certain embodiments, the light source is a non-laser light source, such as a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED.

In other embodiments, the light source is a broadband light source, such as a broadband light source coupled to one or more optical bandpass filters, diffraction gratings, monochromators or any combination thereof. In some instances, the broadband light source emits light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources include an array of infra-red LEDs.

In certain embodiments, the light source is a laser, such as continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

Systems may include one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments systems include an array of lasers, such as an array having one or more gas lasers, one or more dye lasers and one or more solid-state lasers.

In some embodiments, the light source is a narrow bandwidth light source. In some instance, the light source is a light source that outputs a specific wavelength from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The light source may be positioned from the from any suitable distance from the flow stream, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle such as at an angle with the photodetector, such as from 10° to 90°, such as from 15° to 85°, such as from 20° to 80°, such as from 25° to 75° and including from 30° to 60°, for example at a 90° angle.

In certain embodiments, the light source is a continuous wave light source. In some embodiments, the continuous wave light source emits non-pulsed or non-stroboscopic irradiation. In certain embodiments, the continuous wave light source provides for substantially constant emitted light intensity. For instance, the continuous wave light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the system has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the system has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the system has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the system has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the system has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

In certain instances, light beam generators configured to generate two or more beams of frequency shifted light include laser excitation modules as described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In embodiments, systems include a light detection system having one or more photodetectors, such as 2 or more photodetectors, such as 3 or more photodetectors, such as 4 or more photodetectors, such as 5 or more photodetectors, such as 10 or more photodetectors, such as 25 or more photodetectors, such as 50 or more photodetectors, such as 100 or more photodetectors, such as 250 or more photodetectors and including 500 or more photodetectors. In some embodiments, the photodetector is an avalanche photodiode. In certain embodiments, the light detection system includes an array of photodetectors. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodiode array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector in the array may have an active surface with a width that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm and a length that ranges from 5 μm to 250 μm, such as from 10 μm to 225 μm, such as from 15 μm to 200 μm, such as from 20 μm to 175 μm, such as from 25 μm to 150 μm, such as from 30 μm to 125 μm and including from 50 μm to 100 μm, where the surface area of each photodetector in the array ranges from 25 to μm$^2$ to 10000 μm$^2$, such as from 50 to μm$^2$ to 9000 μm$^2$, such as from 75 to μm$^2$ to 8000 μm$^2$, such as from 100 to μm$^2$ to 7000 μm$^2$, such as from 150 to μm$^2$ to 6000 μm$^2$ and including from 200 to μm$^2$ to 5000 μm$^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodiode array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodiode array may range from 0.1 mm$^2$ to 10000 mm$^2$, such as from 0.5 mm$^2$ to 5000 mm$^2$, such as from 1 mm$^2$ to 1000 mm$^2$, such as from 5 mm$^2$ to 500 mm$^2$, and including from 10 mm$^2$ to 100 mm$^2$.

Photodetectors of interest are configured to measure collected light at one or more wavelengths, such as at 2 or more wavelengths, such as at 5 or more different wavelengths, such as at 10 or more different wavelengths of light, such as 15 or more, such as 25 or more, such as 50 or more, such as 100 or more, such as 200 or more, such as 300 or, such as 400 or more, such as 500 or more, such as 1000 or more, such as 1500 or more, such as 2500 or more and including 5000 or more different wavelengths of light. In certain embodiments, photodiodes are configured to measure a spectrum of light, such as where the spectrum of light includes wavelengths which span 50 nm or more, such as 100 nm or more, such as 200 nm or more, such as 300 nm or more, such as 400 nm or more, such as 500 nm or more, such as 600 or more, such as 700 nm or more, such as 800 nm or more, such as 900 nm or more, such as 1000 nm or more and including 1500 nm or more. For instance, photodiodes are configured to measure light in a range from 200 nm to 1500 nm, such as from 400 nm to 1100 nm.

The light detection system is configured to measure light continuously or in discrete intervals. In some instances, photodetectors of interest are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In certain embodiments, light detection systems also include an amplifier component. In embodiments, the amplifier component is configured to amplify output signals from the photodetectors in response to detected light. In some embodiments, the amplifier component includes a current-to-voltage converter, such as a transimpedence amplifier. In other embodiments, the amplifier component includes an operational amplifier circuit, such as a summing amplifier. In embodiments, output currents from the photodetectors are converted to voltages and in certain instances, combined with summing amplifiers and propagated to a processor for outputting a data signal.

Systems are configured to generate data signals from the photodetector in response to light from the flow stream. In some embodiments, the light detection systems are configured to detect light from a particle-free component of an irradiated flow stream. In these embodiments, systems may include memory having instructions stored thereon, which when executed by the processor, cause the processor to generate data signals from light detected from a particle-free component of the irradiated flow stream over a sampling period having a duration of from 0.001 µs to 100 µs, such as from 0.005 µs to 95 µs, such as from 0.01 µs to 90 µs, such as from 0.05 µs to 85 µs, such as from 0.1 µs to 80 µs, such as from 0.5 µs to 75 µs, such as from 1 µs to 70 µs, such as from 2 µs to 65 µs, such as from 3 µs to 60 µs, such as from 4 µs to 55 µs and including from 5 µs to 50 µs. In certain instances, the memory includes instructions for generating data signals from light detected from a particle-free component of an irradiated flow stream over a sampling period having a duration of from 1 µs to 10 µs.

In embodiments, systems include a processor having memory operably coupled to the processor where the memory includes instructions stored thereon, which when executed by the processor, cause the processor to calculate a moving average mean squared error of generated data signals. In some embodiments, the memory includes instructions for calculating the moving average mean squared error by measuring a squared difference between a generated data signal and a calculated baseline data signal. In certain instances, the memory includes instructions for calculating the moving average mean squared error of the generated data signals by measuring a squared difference between a plurality of generated data signals and a calculated baseline data signal over a predetermined sampling period to generate a plurality of baseline noise signals, summing the baseline noise signals over the sampling period and dividing the summed baseline noise signals by the number of the baseline noise signals generated over the predetermined sampling period. In some instances, the predetermined sampling period is a duration of from 0.001 µs to 100 µs, such as from 0.005 µs to 95 µs, such as from 0.01 µs to 90 µs, such as from 0.05 µs to 85 µs, such as from 0.1 µs to 80 µs, such as from 0.5 µs to 75 µs, such as from 1 µs to 70 µs, such as from 2 µs to 65 µs, such as from 3 µs to 60 µs, such as from 4 µs to 55 µs and including from 5 µs to 50 µs.

In certain embodiments, systems include memory having instructions stored thereon, which when executed by the processor, cause the processor to calculate the moving average mean squared error of the generated data signals at predetermined time intervals. For example, the memory may include instructions for calculating the moving average mean squared error of the generated data signals at a frequency of once every 0.0001 ms or more, such as once every 0.0005 ms or more, such as once every 0.001 ms or more, such as once every 0.005 ms or more, such as once every 0.01 ms or more, such as once every 0.05 ms or more, such as once every 0.1 ms or more, such as once every 0.5 ms or more, such as once every 1 ms or more, such as once every 1 ms or more, such as once every 2 ms or more, such as once every 3 ms or more, such as once every 4 ms or more, such as once every 5 ms or more, such as once every 10 ms or more, such as once every 25 ms or more, such as once every 50 ms or more, such as once every 100 ms or more and including once every 500 ms or more. In some embodiments, the memory includes instructions for calculating the moving average mean squared error of the generated data signals at a frequency of once every second, such as once every 2 seconds, such as once every 3 seconds, such as once every 4 seconds, such as once every 5 seconds, such as once every 10 seconds, such as once every 15 seconds, such as once every 30 seconds and including once every 60 seconds. In other embodiments, the memory includes instructions for calculating the moving average mean squared error of the generated data signals at a frequency of once every minute such as once every 2 minutes, such as once every 3 minutes, such as once every 4 minutes, such as once every 5 minutes, such as once every 10 minutes, such as once every 15 minutes, such as once every 30 minutes and including once every 60 minutes. In certain embodiments, the memory includes instructions for continuously calculating the moving average mean squared error of the generated data signals.

In certain embodiments, systems include a processor having memory operably coupled to the processor where the memory includes instructions stored thereon, which when executed by the processor, cause the processor to continuously compute and update the mean squared error of the baseline noise signal over a sampling window. For example, the duration of the sampling window may be from 1 µs or more, such as 10 µs or more, such as 25 µs or more, such as 50 µs or more, such as 100 µs or more, such as 500 µs or more, such as 1 ms or more, such as 10 ms or more, such as 25 ms or more, such as 50 ms or more, such as 100 ms or more, such as 500 ms or more, such as 1 second or more, such as 5 seconds or more, such as 10 seconds or more, such as 25 seconds or more, such as 50 seconds or more, such as 100 seconds or more and including over a sampling window duration of 500 seconds or more. In these embodiments, the system may be configured to calculate the mean-squared error over all or part of the sampling window duration, such as 5% or more of the duration of the sampling window, such as 10% or more, such as 15% or more, such as 25% or more, such as 50% or more, such as 75% or more, such as 90% or more, such as 95% or more, such as 97% or more and including over 99% or more of the sampling window duration. In certain embodiments, the system is configured to continuously calculate the mean-squared error over the entire (100%) sampling window duration.

In some embodiments, the subject systems include memory having instructions for measuring the baseline noise of each photodetector as the square of the difference between a current sample value and a calculated baseline. In some instances, the memory includes instructions for sampling the baseline noise every 2^baseline sample interval clocks over a 2^baseline window size clocks. The memory may include instructions for dividing the sum of the baseline noise sample by the number of noise samples accumulated to get the mean squared baseline noise measurement. In certain embodiments, an approximated average of this value is used for each sample, such as where for each sample the sum of the squared noise is continuously updated according to embodiments of the present disclosure as: (current sum)−(current average)+(new baseline noise squared sample). In certain embodiments, the memory includes instructions for periodically updating the baseline sampling over the course of data acquisition, such as with a frequency of once every 1 µs or more, such as once every 10 µs or more, such as once every 25 µs or more, such as once every 50 µs or more, such as once every 100 µs or more, such as once every 500 µs or more, such as once every 1 ms or more, such as once every 10 ms or more, such as once every 25 ms or more, such as once every 50 ms or more, such as once every 100 ms or more, such as once every 500 ms or more, such as once every 1 second or more, such as once every 5 seconds or more, such as once every 10 seconds or more, such as once every 25 seconds or more, such as once every 50 seconds or more, such as once every 100 seconds or more and including where the memory includes instructions for updating the baseline sampling once every 500 seconds or more.

In certain embodiments, the memory includes instructions stored thereon which when executed by the processor cause the processor to update the baseline noise of each photodetector at a predetermined time period before light is detected from a particle in the sample. For example, in some instances systems include memory having instructions for updating the baseline noise of each photodetector immediately before generating a data signal from light detected from a particle in the sample. In other instances, the memory includes instructions for updating the baseline noise of each photodetector from 0.0001 µs to 500 µs before generating a data signal from light detected from a particle in the sample, such as from 0.0005 µs to 450 µs, such as from 0.001 µs to 400 µs, such as from 0.005 µs to 350 µs, such as from 0.01 µs to 300 µs, such as from 0.05 µs to 250 µs, such as from 0.1 µs to 200 µs, such as from 0.5 µs to 150 µs and including instructions for updating the baseline noise of each photodetector from 1 µs to 100 µs before generating a data signal from light detected from a particle in the sample.

In certain embodiments, systems include a processor having memory operably coupled to the processor where the memory includes instructions stored thereon, which when executed by the processor, cause the processor to adjust the bandwidth of the calculated baseline noise for each photodetector. In some instances, the memory includes instructions for adjusting the bandwidth of the calculated baseline noise by increasing the bandwidth, such as by 5% or more, such as by 10% or more, such as by 15% or more, such as by 25% or more, such as by 50% or more, such as by 75% or more, such as by 90% or more including increasing the bandwidth of the calculated baseline noise by 99% or more. For example, the memory may include instructions for increasing the bandwidth of the calculated baseline noise by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 µs or more, such as by 2 µs or more, such as by 3 µs or more, such as by 4 µs or more, such as by 5 µs or more, such as by 10 µs or more, such as by 25 µs or more, such as by 50 µs or more and including by increasing the bandwidth of the calculated baseline noise by 100 µs or more. In other instances, the memory includes instructions for adjusting the bandwidth of the calculated baseline noise by decreasing the bandwidth, such as by 5% or more, such as by 10% or more, such as by 15% or more, such as by 25% or more, such as by 50% or more, such as by 75% or more, such as by 90% or more including decreasing the bandwidth of the calculated baseline noise by 99% or more. For example, the memory may include instructions for decreasing the bandwidth of the calculated baseline noise by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 µs or more, such as by 2 µs or more, such as by 3 µs or more, such as by 4 µs or more, such as by 5 µs or more, such as by 10 µs or more, such as by 25 µs or more, such as by 50 µs or more and including by decreasing the bandwidth of the calculated baseline noise by 100 µs or more. In certain embodiments, the memory includes instructions for matching the bandwidth of the calculated baseline noise with the bandwidth of data signals generated from particles in the sample. For example, the memory may include instructions for adjusting the bandwidth of the calculated baseline noise to be 50% or more of the bandwidth of data signals generated from particles in the sample, such as 60% or more, such as 70% or more, such as 80% or more, such as 90% or more, such as 95% or more, such as 97% or more, such as 99% or more and including where the bandwidth of the calculated baseline noise is adjusted to be 99.9% or more of the bandwidth of data signals generated from particles in the sample. In certain embodiments, the memory includes instructions for matching (100%) the bandwidth of the calculated baseline noise to the bandwidth of data signals generated from particles in the sample.

In some embodiments, the sample includes a plurality of fluorophores, where one or more of the fluorophores have overlapping fluorescence spectra. In some instances, systems include a processor having memory operably coupled to the processor where the memory includes instructions stored thereon, which when executed by the processor, cause the processor to spectrally resolve the light from each type of fluorophore in the sample, such as by calculating a spectral unmixing matrix for the fluorescence spectra of each type of fluorophore in the sample. In certain embodiments, the memory includes instructions for determining the overlap of the spectra of light from the flow stream and calculating the contribution of each to the overlapping detected light spectra. In certain embodiments, the memory includes instructions for calculating a spectral unmixing matrix to estimate the abundance of each contribution to the detected light signal by the photodetectors. In certain instances, the spectral unmixing matrix is calculated using a weighted least squares algorithm. In some embodiments, the memory includes instructions for weighting the generated data signals from the light from the free fluorophores in the sample based on the calculated baseline noise of the photodetector.

In certain embodiments, systems are configured to spectrally resolve light (e.g., weighted using the calculated baseline noise of each photodetector) detected by the plurality of photodetectors such as described e.g., in International Patent Application No. PCT/US2019/068395 filed on Dec. 23, 2019; U.S. Provisional Patent Application No. 62/971,840 filed on Feb. 7, 2020 and U.S. Provisional Patent Application No. 63/010,890 filed on Apr. 16, 2020, the disclosures of which are herein incorporated by reference in their entirety. For example, systems may include memory having instructions for spectrally resolving light detected by a plurality of photodetectors by solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

Figure 3A:
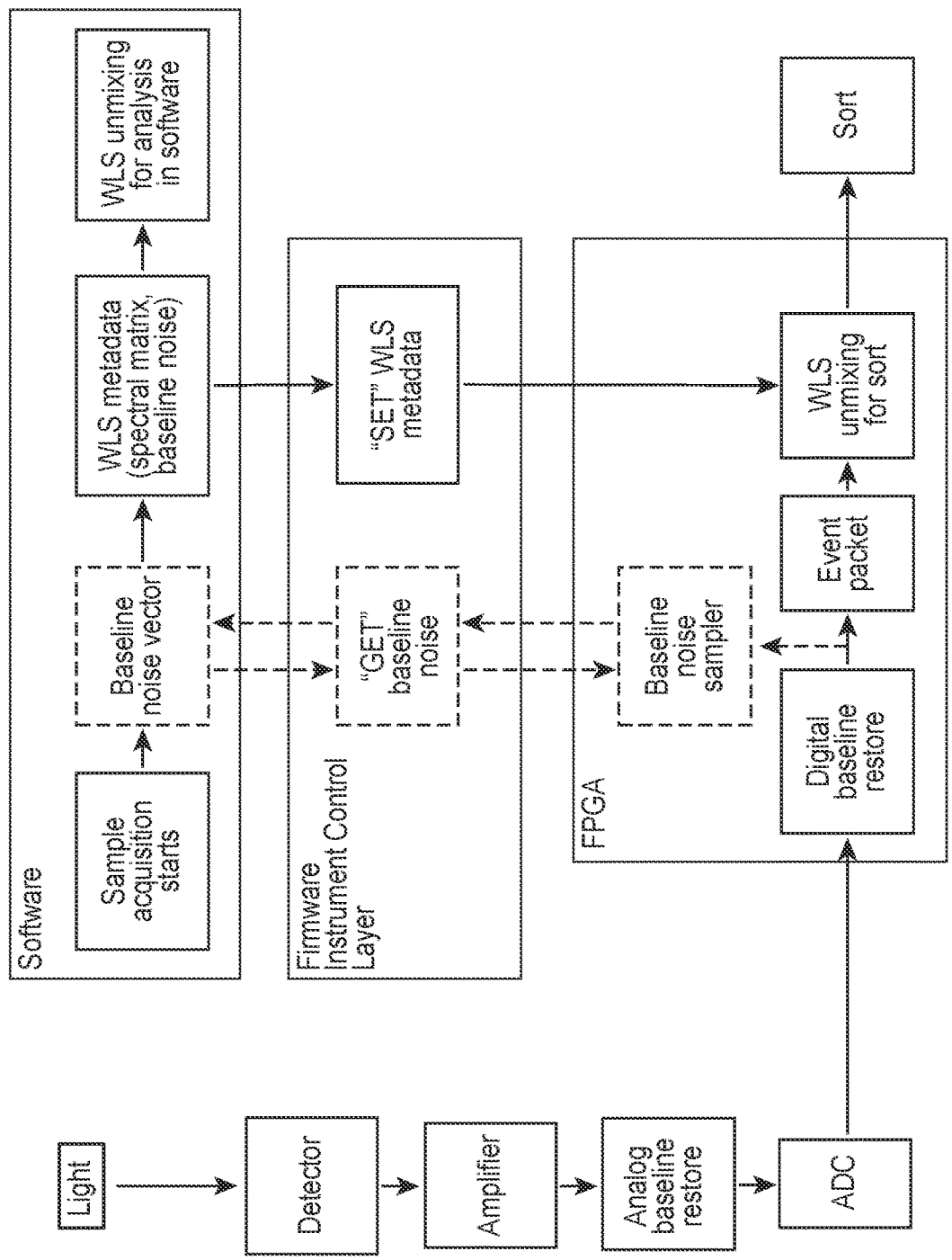
FIG. 3A depicts a block diagram of a system for spectrally resolving fluorescence from a sample having particles irradiated in a flow stream according to certain embodiments.

FIG. 3A depicts a block diagram of a system for spectrally resolving fluorescence from a sample having particles irradiated in a flow stream according to certain embodiments. Light from the irradiated sample is detected by a light detection system that includes a detector, amplifier, analog baseline restore component and an analog-to-digital (ADC) converter). The light detection system is operably coupled to an integrated circuit (e.g., FPGA, as described in greater detail below) which receives a baseline noise determination based on a calculated baseline noise vector. The baseline noise vector is used by a computer program (e.g., stored in memory on a processor) in a weighted least squares algorithm to calculate a spectral unmixing matrix. The spectral unmixing matrix solved with the weighted least squares algorithm may be conveyed back to the integrated circuit for sorting particles of the sample.

Figure 3B:
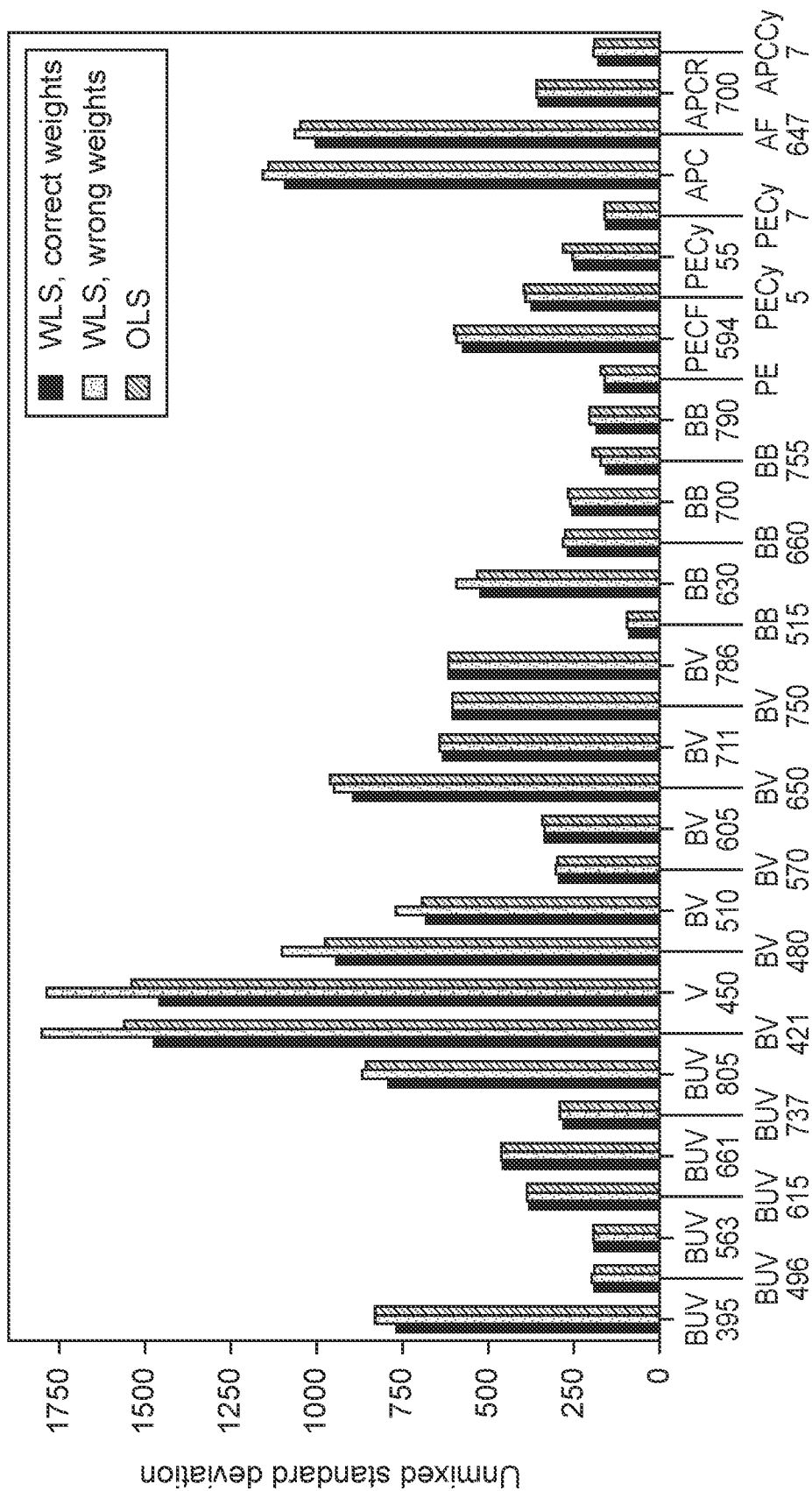
FIG. 3B depicts an example of simulated spectral unmixing uncertainty from spectrally resolving fluorescence using an ordinary least squares and a weighted least squares algorithm according to certain embodiments.

FIG. 3B depicts an example of simulated spectral unmixing uncertainty from spectrally resolving fluorescence using an ordinary least squares (OLS) and a weighted least squares (WLS) algorithm according to certain embodiments. The simulated unmixing uncertainty for a random expression pattern of 32 fluorophores using OLS or WLS with different baseline noise weights was calculated. All simulations were performed with baseline noise representative of a fully-stained sample. As depicted in FIG. 3B, "WLS, correct weights" depicts the spectral unmixing uncertainty using the true baseline noise vector whereas "WLS, wrong weights" depicts unmixing uncertainty when the baseline noise vector is measured in the absence of sample solution, which underestimates baseline noise. In certain cases, spectral unmixing calculated using an incorrect weight exhibit even greater uncertainty than when calculated without weight factors, as is calculated using an OLS algorithm.

In certain embodiments, light detection systems having the one or more photodetectors as described above are part of or positioned in a particle analyzer, such as a particle sorter. In certain embodiments, the subject systems are flow cytometric systems that includes the photodiode and amplifier component as part of a light detection system for detecting light emitted by a sample in a flow stream. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost.* 2004 October; 30(5):502-11; Alison, et al. *J Pathol,* 2010 December; 222(4):335-344; and Herbig, et al. (2007) *Crit Rev Ther Drug Carrier Syst*. 24(3): 203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle analyzer systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain embodiments, the subject systems are flow cytometric systems having an excitation module that uses radio-frequency multiplexed excitation to generate a plurality of frequency shifted beams of light. In certain instances, the subject systems are flow cytometric systems as described in Diebold, et al. *Nature Photonics* Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,408,758; 10,451, 538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g, cells) of the sample are sorted using a sort decision module having a plurality of sort decision units, such as those described in U.S. patent application Ser. No. 16/725,756, filed on Dec. 23, 2019, the disclosure of which is incorporated herein by reference. In some embodiments, the subject particle sorting systems are flow cytometric systems, such those described in U.S. Pat. Nos. 10,663,476; 10,620,111; 10,613,017; 10,605,713; 10,585,031; 10,578,542; 10,578,469; 10,481, 074; 10,302,545; 10,145,793; 10,113,967; 10,006,852; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; 4,987,086; 4,498,766; the disclosures of which are herein incorporated by reference in their entirety.

Figure 4A:
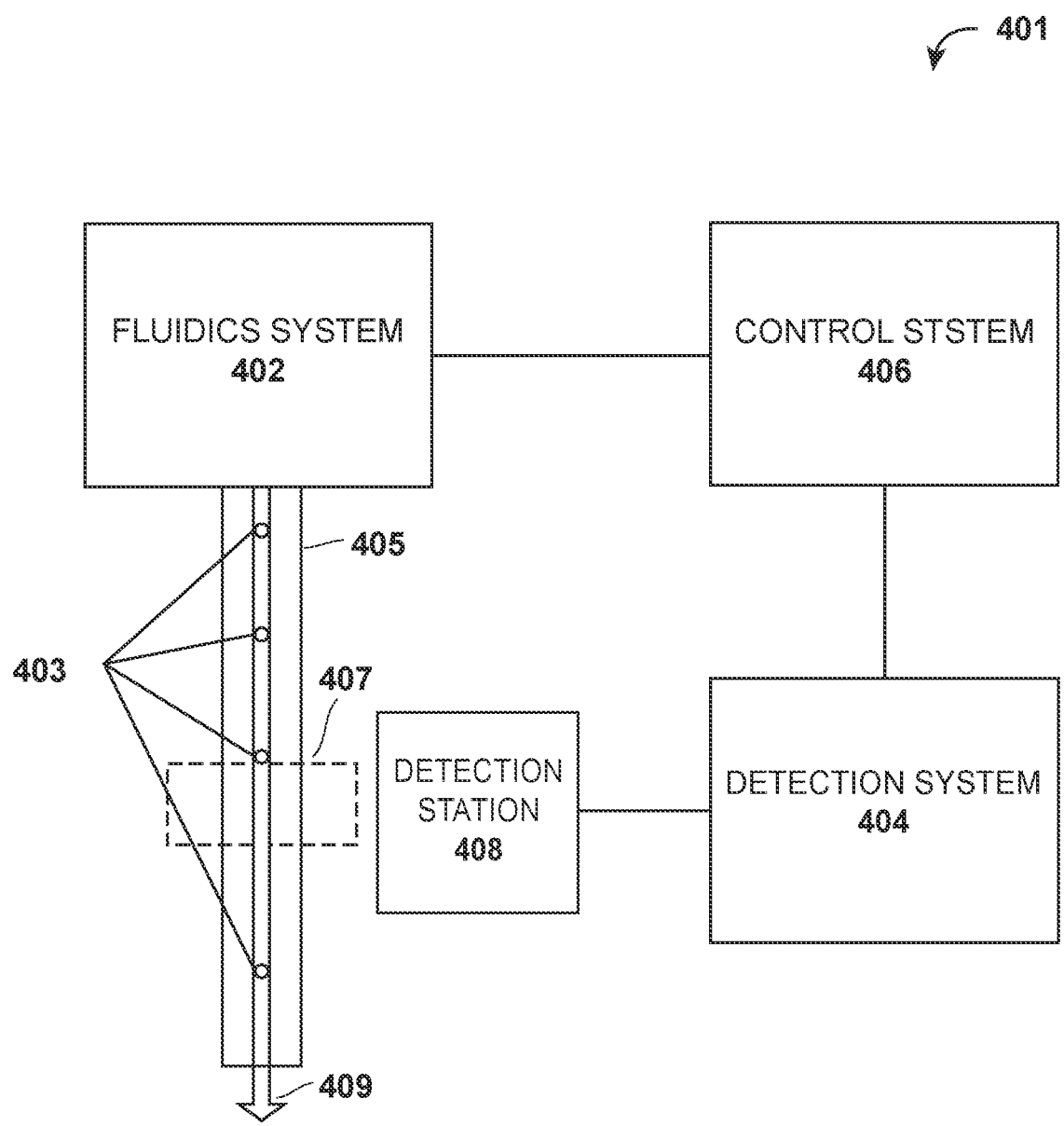
FIG. 4A depicts a functional block diagram of a particle analysis system for computational based sample analysis and particle characterization according to certain embodiments.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402. The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
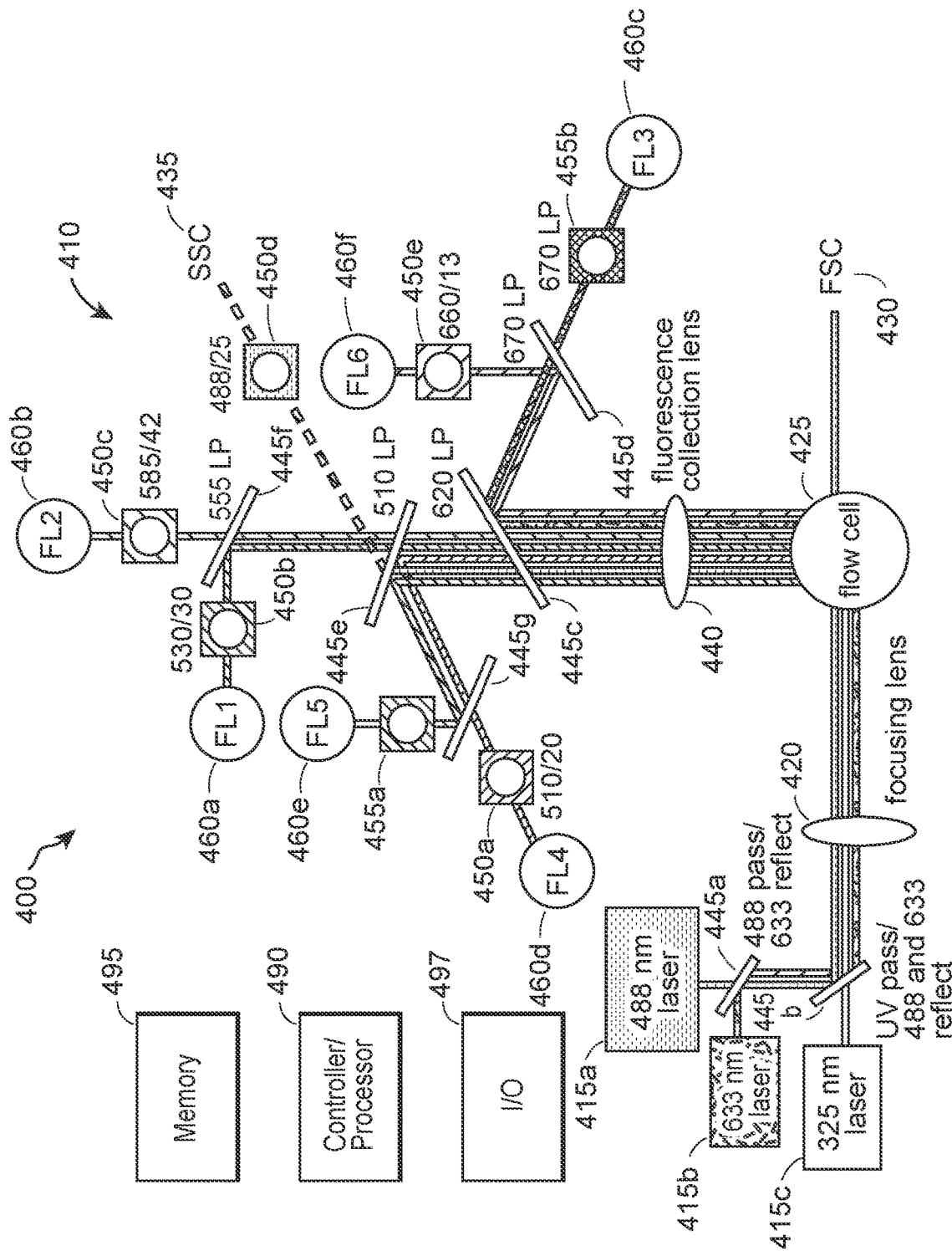
FIG. 4B depicts a flow cytometer according to certain embodiments.

FIG. 4B shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
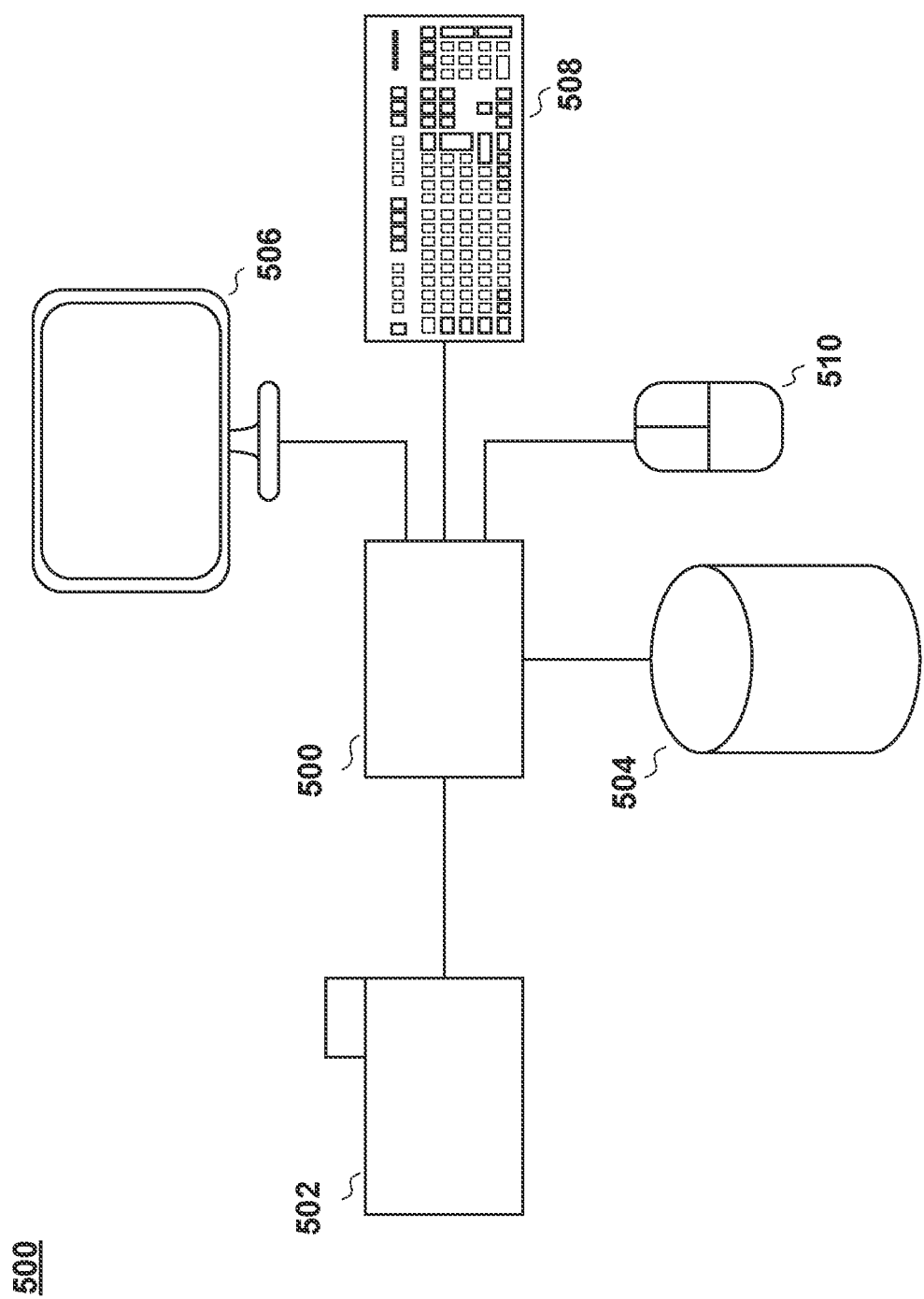
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer 502 can be configured to acquire biological event data. For example, a flow cytometer can generate flow cytometric event data. The particle analyzer 502 can be configured to provide biological event data to the analytics controller 500. A data communication channel can be included between the particle analyzer 502 and the analytics controller 500. The biological event data can be provided to the analytics controller 500 via the data communication channel.

The analytics controller 500 can be configured to receive biological event data from the particle analyzer 502. The biological event data received from the particle analyzer 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for irradiating a sample comprising particles in a flow stream, instructions for detecting light with a photodetector from the irradiated flow stream, instructions for generating data signals from the detected light and instructions for calculating a moving average mean squared error of the generated data signals to determine the baseline noise of the photodetector.

In some embodiments, the computer program includes instructions for generating data signals in response to light detected from a particle-free component of the irradiated flow stream. In these embodiments, the computer program includes instructions to generate data signals from light detected from a particle-free component of the irradiated flow stream over a sampling period having a duration of from 0.001 μs to 100 μs, such as from 0.005 μs to 95 μs, such as from 0.01 μs to 90 μs, such as from 0.05 μs to 85 μs, such as from 0.1 μs to 80 μs, such as from 0.5 μs to 75 μs, such as from 1 μs to 70 μs, such as from 2 μs to 65 μs, such as from 3 μs to 60 μs, such as from 4 μs to 55 μs and including from 5 μs to 50 μs. In certain instances, the computer program includes instructions for generating data signals from light detected from a particle-free component of an irradiated flow stream over a sampling period having a duration of from 1 μs to 10 μs.

In embodiments, the computer program includes instructions to calculate a moving average mean squared error of generated data signals. In some embodiments, the computer program includes instructions for calculating the moving average mean squared error by measuring a squared difference between a generated data signal and a calculated baseline data signal. In certain instances, the computer program includes instructions for calculating the moving average mean squared error of the generated data signals by measuring a squared difference between a plurality of generated data signals and a calculated baseline data signal over a predetermined sampling period to generate a plurality of baseline noise signals, summing the baseline noise signals over the sampling period and dividing the summed baseline noise signals by the number of the baseline noise signals generated over the predetermined sampling period. In some instances, the predetermined sampling period is a duration of from 0.001 μs to 100 μs, such as from 0.005 μs to 95 μs, such as from 0.01 μs to 90 μs, such as from 0.05 μs to 85 μs, such as from 0.1 μs to 80 μs, such as from 0.5 μs to 75 μs, such as from 1 μs to 70 μs, such as from 2 μs to 65 μs, such as from 3 μs to 60 μs, such as from 4 μs to 55 μs and including from 5 μs to 50 μs.

In certain embodiments, the computer program includes instructions for calculating the moving average mean squared error of the generated data signals at predetermined time intervals. For example, the computer program may include instructions for calculating the moving average mean squared error of the generated data signals at a frequency of once every 0.0001 ms or more, such as once every 0.0005 ms or more, such as once every 0.001 ms or more, such as once every 0.005 ms or more, such as once every 0.01 ms or more, such as once every 0.05 ms or more, such as once every 0.1 ms or more, such as once every 0.5 ms or more, such as once every 1 ms or more, such as once every 1 ms or more, such as once every 2 ms or more, such as once every 3 ms or more, such as once every 4 ms or more, such as once every 5 ms or more, such as once every 10 ms or more, such as once every 25 ms or more, such as once every 50 ms or more, such as once every 100 ms or more and including once every 500 ms or more. In some embodiments, the computer program includes instructions for calculating the moving average mean squared error of the generated data signals at a frequency of once every second, such as once every 2 seconds, such as once every 3 seconds, such as once every 4 seconds, such as once every 5 seconds, such as once every 10 seconds, such as once every 15 seconds, such as once every 30 seconds and including once every 60 seconds. In other embodiments, the computer program includes instructions for calculating the moving average mean squared error of the generated data signals at a frequency of once every minute such as once every 2 minutes, such as once every 3 minutes, such as once every 4 minutes, such as once every 5 minutes, such as once every 10 minutes, such as once every 15 minutes, such as once every 30 minutes and including once every 60 minutes. In certain embodiments, the computer program includes instructions for continuously calculating the moving average mean squared error of the generated data signals.

In certain embodiments, the computer program includes instructions for continuously computing and updating the mean squared error of the baseline noise signal over a sampling window. For example, the duration of the sampling window may be from 1 μs or more, such as 10 μs or more, such as 25 μs or more, such as 50 μs or more, such as 100 μs or more, such as 500 μs or more, such as 1 ms or more, such as 10 ms or more, such as 25 ms or more, such as 50 ms or more, such as 100 ms or more, such as 500 ms or more, such as 1 second or more, such as 5 seconds or more, such as 10 seconds or more, such as 25 seconds or more, such as 50 seconds or more, such as 100 seconds or more and including over a sampling window duration of 500 seconds or more. In these embodiments, the computer program may include instructions for calculating the mean-squared error over all or part of the sampling window duration, such as 5% or more of the duration of the sampling window, such as 10% or more, such as 15% or more, such as 25% or more, such as 50% or more, such as 75% or more, such as 90% or more, such as 95% or more, such as 97% or more and including over 99% or more of the sampling window duration. In certain embodiments, the computer program includes instructions for continuously calculating the mean-squared error over the entire (100%) sampling window duration.

In some embodiments, the computer program includes instructions for measuring the baseline noise of each photodetector as the square of the difference between a current sample value and a calculated baseline. In some instances, the computer program includes instructions for sampling the baseline noise every 2^baseline sample interval clocks over a 2^baseline window size clocks. The computer program may include instructions for dividing the sum of the baseline noise sample by the number of noise samples accumulated to get the mean squared baseline noise measurement. In certain embodiments, an approximated average of this value is used for each sample, such as where for each sample the sum of the squared noise is continuously updated according to embodiments of the present disclosure as: (current sum)−(current average)+(new baseline noise squared sample). In certain embodiments, the computer program includes instructions for periodically updating the baseline sampling over the course of data acquisition, such as with a frequency of once every 1 µs or more, such as once every 10 µs or more, such as once every 25 µs or more, such as once every 50 µs or more, such as once every 100 µs or more, such as once every 500 µs or more, such as once every 1 ms or more, such as once every 10 ms or more, such as once every 25 ms or more, such as once every 50 ms or more, such as once every 100 ms or more, such as once every 500 ms or more, such as once every 1 second or more, such as once every 5 seconds or more, such as once every 10 seconds or more, such as once every 25 seconds or more, such as once every 50 seconds or more, such as once every 100 seconds or more and including where the computer program includes instructions for updating the baseline sampling once every 500 seconds or more.

In certain embodiments, the computer program includes instructions stored thereon which when executed by the processor cause the processor to update the baseline noise of each photodetector at a predetermined time period before light is detected from a particle in the sample. For example, in some instances the computer program has instructions for updating the baseline noise of each photodetector immediately before generating a data signal from light detected from a particle in the sample. In other instances, the computer program includes instructions for updating the baseline noise of each photodetector from 0.0001 µs to 500 µs before generating a data signal from light detected from a particle in the sample, such as from 0.0005 µs to 450 µs, such as from 0.001 µs to 400 µs, such as from 0.005 µs to 350 µs, such as from 0.01 µs to 300 µs, such as from 0.05 µs to 250 µs, such as from 0.1 µs to 200 µs, such as from 0.5 µs to 150 µs and including instructions for updating the baseline noise of each photodetector from 1 µs to 100 µs before generating a data signal from light detected from a particle in the sample.

In certain embodiments, the computer program includes instructions for adjusting the bandwidth of the calculated baseline noise for each photodetector. In some instances, the computer program includes instructions for adjusting the bandwidth of the calculated baseline noise by increasing the bandwidth, such as by 5% or more, such as by 10% or more, such as by 15% or more, such as by 25% or more, such as by 50% or more, such as by 75% or more, such as by 90% or more including increasing the bandwidth of the calculated baseline noise by 99% or more. For example, the computer program may include instructions for increasing the bandwidth of the calculated baseline noise by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 µs or more, such as by 2 µs or more, such as by 3 µs or more, such as by 4 µs or more, such as by 5 µs or more, such as by 10 µs or more, such as by 25 µs or more, such as by 50 µs or more and including by increasing the bandwidth of the calculated baseline noise by 100 µs or more. In other instances, the computer program includes instructions for adjusting the bandwidth of the calculated baseline noise by decreasing the bandwidth, such as by 5% or more, such as by 10% or more, such as by 15% or more, such as by 25% or more, such as by 50% or more, such as by 75% or more, such as by 90% or more including decreasing the bandwidth of the calculated baseline noise by 99% or more. For example, the computer program may include instructions for decreasing the bandwidth of the calculated baseline noise by 0.0001 µs or more, such as by 0.0005 µs or more, such as by 0.001 µs or more, such as by 0.005 µs or more, such as by 0.01 µs or more, such as by 0.05 µs or more, such as by 0.1 µs or more, such as by 0.5 µs or more, such as by 1 µs or more, such as by 2 µs or more, such as by 3 µs or more, such as by 4 µs or more, such as by 5 µs or more, such as by 10 µs or more, such as by 25 µs or more, such as by 50 µs or more and including by decreasing the bandwidth of the calculated baseline noise by 100 µs or more. In certain embodiments, the computer program includes instructions for matching the bandwidth of the calculated baseline noise with the bandwidth of data signals generated from particles in the sample. For example, the computer program may include instructions for adjusting the bandwidth of the calculated baseline noise to be 50% or more of the bandwidth of data signals generated from particles in the sample, such as 60% or more, such as 70% or more, such as 80% or more, such as 90% or more, such as 95% or more, such as 97% or more, such as 99% or more and including where the bandwidth of the calculated baseline noise is adjusted to be 99.9% or more of the bandwidth of data signals generated from particles in the sample. In certain embodiments, the computer program includes instructions for matching (100%) the bandwidth of the calculated baseline noise to the bandwidth of data signals generated from particles in the sample.

In certain embodiments, the computer program includes instructions for spectrally resolving light (e.g., weighted using the calculated baseline noise of each photodetector) detected by the plurality of photodetectors such as described e.g., in International Patent Application No. PCT/US2019/068395 filed on Dec. 23, 2019; U.S. Provisional Patent Application No. 62/971,840 filed on Feb. 7, 2020 and U.S. Provisional Patent Application No. 63/010,890 filed on Apr. 16, 2020, the disclosures of which are herein incorporated by reference in their entirety. For example, the computer program may have instructions for spectrally resolving light detected by a plurality of photodetectors by solving a spectral unmixing matrix using one or more of: 1) a weighted least square algorithm; 2) a Sherman-Morrison iterative inverse updater; 3) an LU matrix decomposition, such as where a matrix is decomposed into a product of a lower-triangular (L) matrix and an upper-triangular (U) matrix; 4) a modified Cholesky decomposition; 5) by QR factorization; and 6) calculating a weighted least squares algorithm by singular value decomposition.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via a system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 6:
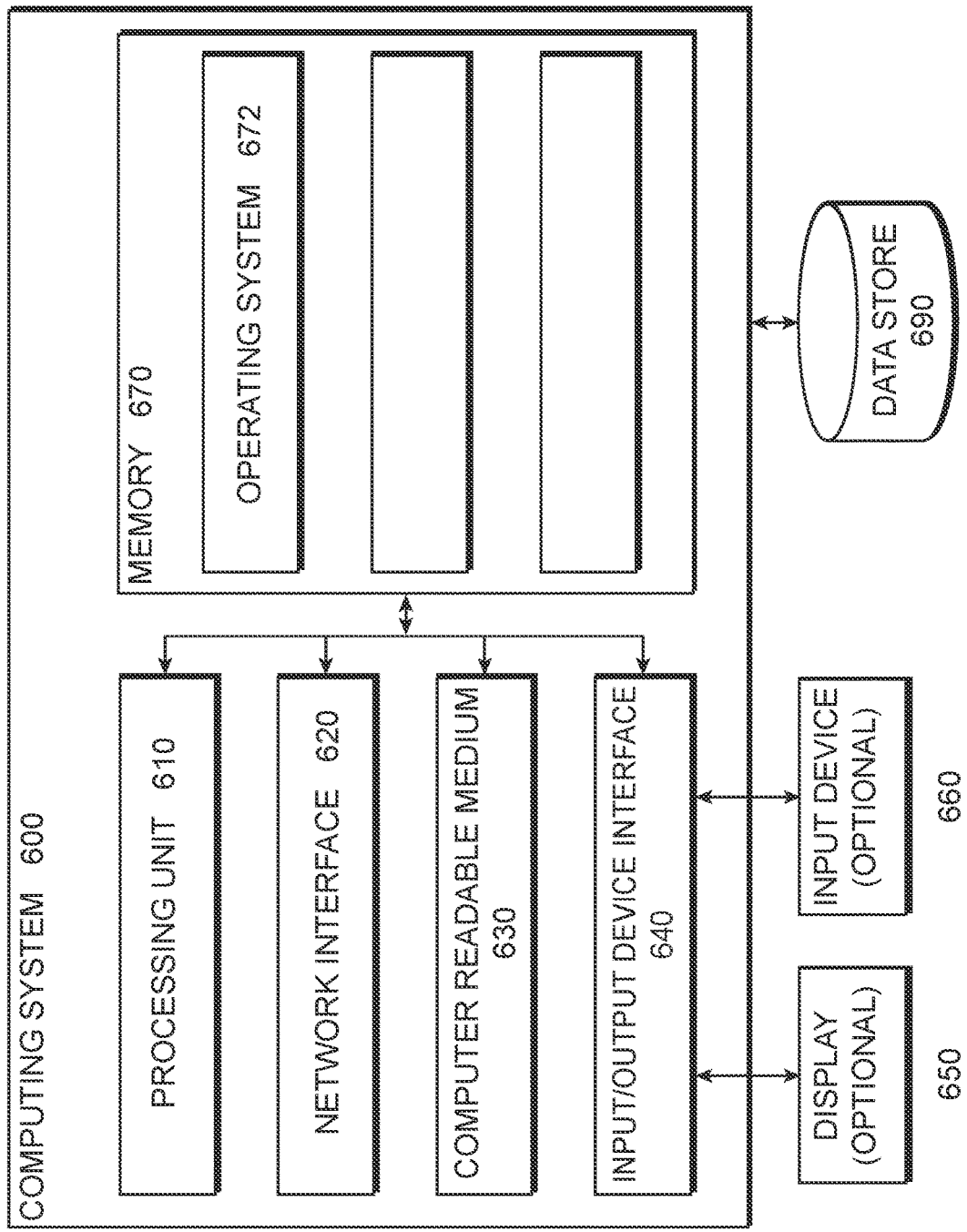
FIG. 6 depicts a block diagram of a computing system according to certain embodiments.

FIG. 6 depicts a general architecture of an example computing device 600 according to certain embodiments. The general architecture of the computing device 600 depicted in FIG. 6 includes an arrangement of computer hardware and software components. The computing device 600 may include many more (or fewer) elements than those shown in FIG. 6. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. The input/output device interface 640 may also accept input from the optional input device 660, such as a keyboard, mouse, digital pen, microphone, touch screen, gesture recognition system, voice recognition system, gamepad, accelerometer, gyroscope, or other input device. Computing device 600 is also connected to data storage 690.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. The memory 670 may further include computer program instructions and other information for implementing aspects of the present disclosure.

Non-Transitory Computer-Readable Storage Medium for Measuring Baseline Noise of a Photodetector in a Light Detection System Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having algorithm for calculating a moving average mean squared error of data signals generated from light detected from irradiated particles of a sample in a flow stream. In some embodiments, the non-transitory computer readable storage medium includes algorithm for calculating the moving average mean squared error of the generated data signals by measuring a squared difference between a generated data signal and a calculated baseline data signal. In certain embodiments, the non-transitory computer readable storage medium includes algorithm for measuring a squared difference between a plurality of generated data signals and a calculated baseline data signal over a predetermined sampling period to generate a plurality of baseline noise signals, algorithm for summing the baseline noise signals over the sampling period and dividing the summed baseline noise signals by the number of the baseline noise signals generated over the predetermined sampling period. In some instances, the predetermined sampling period is a duration of from 0.001 µs to 100 µs. In other instances, the predetermined sampling period is a duration of from 1 µs to 10 µs.

In some embodiments, the non-transitory computer readable storage medium includes algorithm for calculating the moving average mean squared error of the generated data signals at predetermined time intervals. In some instances, the non-transitory computer readable storage medium includes algorithm for calculating the moving average mean squared error of the generated data signals at a frequency of once every millisecond to once every 1000 milliseconds. For example, the non-transitory computer readable storage medium may include algorithm for calculating the moving average mean squared error of the generated data signals at a frequency of once every 1 ms or more, such as once every 5 ms or more, such as once every 10 ms or more, such as once every 25 ms or more, such as once every 50 ms or more, such as once every 100 ms or more and including once every 500 ms or more. In other embodiments, the non-transitory computer readable storage medium includes algorithm for calculating the moving average mean squared error of the generated data signals at a frequency of once every second to once every 60 seconds. In still other embodiments, the non-transitory computer readable storage medium includes algorithm for calculating the moving average mean squared error of the generated data signals at a frequency of once every minute to once every 60 minutes. In certain embodiments, the non-transitory computer readable storage medium includes algorithm for continuously calculating the moving average mean squared error of the generated data signals.

In certain embodiments, the non-transitory computer readable storage medium includes algorithm for detecting with the photodetector light from the free fluorophores in the sample with the photodetector, algorithm for generating data signals from the detected light and algorithm for calculating a moving average mean squared error of the generated data signals from the light emanating from the free fluorophores in the sample. In some instances, the non-transitory computer readable storage medium includes algorithm for spectrally resolving the light from each type of fluorophore in the sample. In certain instances, the non-transitory computer readable storage medium includes algorithm for resolving light from each type of fluorophore by calculating a spectral unmixing matrix for the fluorescence spectra of each type of fluorophore in the sample. In certain instances, the non-transitory computer readable storage medium includes algorithm for calculating the spectral unmixing matrix by using a weighted least squares algorithm. In some embodiments, the non-transitory computer readable storage medium includes algorithm for weighting the generated data signals from the light from the free fluorophores in the sample based on the determined baseline noise of the photodetector.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Integrated Circuit Devices

Aspects of the present disclosure also include integrated circuit devices programmed to calculate a moving average mean squared error of data signals generated from light detected from irradiated particles of a sample in a flow stream. In some embodiments, integrated circuit devices of interest include a field programmable gate array (FPGA). In other embodiments, integrated circuit devices include an application specific integrated circuit (ASIC). In yet other embodiments, integrated circuit devices include a complex programmable logic device (CPLD).

In some embodiments, the integrated circuit is programmed to calculate the moving average mean squared error of the generated data signals by measuring a squared difference between a generated data signal and a calculated baseline data signal. In certain embodiments, the integrated circuit is programmed to measure a squared difference between a plurality of generated data signals and a calculated baseline data signal over a predetermined sampling period to generate a plurality of baseline noise signals, sum the baseline noise signals over the sampling period and divide the summed baseline noise signals by the number of the baseline noise signals generated over the predetermined sampling period. In some instances, the predetermined sampling period is a duration of from 0.001 µs to 100 µs. In other instances, the predetermined sampling period is a duration of from 1 µs to 10 µs.

In some embodiments, integrated circuits of the present disclosure are programmed to calculate the moving average mean squared error of the generated data signals at predetermined time intervals. In some instances, the integrated circuit is programmed to calculate the moving average mean squared error of the generated data signals at a frequency of once every millisecond to once every 1000 milliseconds. For example, the integrated circuit may be programmed to calculate the moving average mean squared error of the generated data signals at a frequency of once every 1 ms or more, such as once every 5 ms or more, such as once every 10 ms or more, such as once every 25 ms or more, such as once every 50 ms or more, such as once every 100 ms or more and including once every 500 ms or more. In other embodiments, the integrated circuit is programmed to calculate the moving average mean squared error of the generated data signals at a frequency of once every second to once every 60 seconds. In still other embodiments, the integrated circuit is programmed to calculate the moving average mean squared error of the generated data signals at a frequency of once every minute to once every 60 minutes. In certain embodiments, the integrated circuit is programmed to continuously calculate the moving average mean squared error of the generated data signals.

In certain embodiments, the integrated circuit is programmed to detect with the photodetector light from the free fluorophores in the sample with the photodetector, generate data signals from the detected light and calculate a moving average mean squared error of the generated data signals from the light emanating from the free fluorophores in the sample. In some instances, the integrated circuit is programmed to spectrally resolve the light from each type of fluorophore in the sample. In certain instances, the integrated circuit is programmed to resolve light from each type of fluorophore by calculating a spectral unmixing matrix for the fluorescence spectra of each type of fluorophore in the sample. In certain instances, the integrated circuit is programmed to calculate the spectral unmixing matrix by using a weighted least squares algorithm. In some embodiments, the integrated circuit is programmed to weight the generated data signals from the light from the free fluorophores in the sample based on the determined baseline noise of the photodetector.

Kits

Aspects of the present disclosure further include kits, where kits include one or more of the components of light detection systems described herein. In some embodiments, kits include a photodetector and programming for the subject systems, such as in the form of a computer readable medium (e.g., flash drive, USB storage, compact disk, DVD, Blu-ray disk, etc.) or instructions for downloading the programming from an internet web protocol or cloud server. In some embodiments, kits include a trigger signal generator, such as a function generator or a function generator integrated circuit. Kits may also include an optical adjustment component, such as lenses, mirrors, filters, fiber optics, wavelength separators, pinholes, slits, collimating protocols and combinations thereof.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject methods, systems and computer systems find use in a variety of applications where it is desirable to calibrate or optimize a photodetector, such as in a particle analyzer. The subject methods and systems also find use for photodetectors that are used to analyze and sort particle components in a sample in a fluid medium, such as a biological sample. The present disclosure also finds use in flow cytometry where it is desirable to provide a flow cytometer with improved cell sorting accuracy, enhanced particle collection, reduced energy consumption, particle charging efficiency, more accurate particle charging and enhanced particle deflection during cell sorting. In embodiments, the present disclosure reduces the need for user input or manual adjustment during sample analysis with a flow cytometer. In certain embodiments, the subject methods and systems provide fully automated protocols so that adjustments to a flow cytometer during use require little, if any human input.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method for determining baseline noise of a photodetector in a particle analyzer, the method comprising:
   irradiating a sample comprising particles in a flow stream;
   detecting light with a photodetector from a particle-free component of the irradiated flow stream;
   generating data signals from the detected light;
   calculating a moving average mean squared error of the generated data signals by measuring a squared difference between the generated data signals and baseline data signals; and
   determining the baseline noise of the photodetector based on the calculated mean squared error of the generated data signals over a predetermined period of time.

2. The method according to claim 1, wherein the method comprises detecting the light emanating from the flow stream between particles.

3. The method according to claim 1, wherein calculating the moving average mean squared error of the generated data signals comprises:
   measuring a squared difference between a plurality of generated data signals and a calculated baseline data signal over a predetermined sampling period to generate a plurality of baseline noise signals;

summing the baseline noise signals over the sampling period; and dividing the summed baseline noise signals by the number of the baseline noise signals generated over the predetermined sampling period.

4. The method according to claim 3, wherein the predetermined sampling period comprises a duration of from 0.001 µs to 100 µs.

5. The method according to claim 3, wherein the predetermined sampling period comprises a duration of from 1 µs to 10 µs.

6. The method according to claim 1, wherein the method comprises calculating the moving average mean squared error of the generated data signals at predetermined time intervals.

7. The method according to claim 6, wherein the moving average mean squared error of the generated data signals is calculated at a frequency of once every millisecond to once every 1000 milliseconds.

8. The method according to claim 1, wherein the method comprises continuously calculating the moving average mean squared error of the generated data signals.

9. The method according to claim 1, wherein the sample comprises a plurality of fluorophores having overlapping fluorescence spectra.

10. The method according to claim 9, wherein the particles of the sample are functionally associated with the fluorophores.

11. The method according to claim 9, wherein the flow stream comprises one or more free fluorophores that are functionally unassociated with the particles of the sample.

12. The method according to claim 11, wherein the method comprises:

detecting light from the one or more free fluorophores in the sample with the photodetector;

generating data signals from the detected light; and calculating a moving average mean squared error of the generated data signals from the light emanating from the one or more free fluorophores in the sample.

13. The method according to claim 9, wherein the method further comprises spectrally resolving light from each fluorophore in the sample by calculating a spectral unmixing matrix for the fluorescence spectra of each fluorophore in the sample.

14. The method according to claim 13, wherein the spectral unmixing matrix is calculated using a weighted least squares algorithm.

15. The method according to claim 14, wherein the generated data signals from the photodetector are weighted based on the determined baseline noise of the photodetector.

16. The method according to claim 1, wherein the moving average mean squared error of the generated data signals is calculated on an integrated circuit.

17. The method according to claim 16, wherein the integrated circuit is a field programmable gated array.

18. A system comprising:

a light source configured to irradiate a sample comprising particles in a flow stream;

a light detection system comprising a photodetector for detecting light from a particle-free component of an irradiated flow stream;

a processor comprising memory operably coupled to the processor wherein the memory comprises instructions stored thereon, which when executed by the processor, cause the processor to:

generate data signals from detected light;

calculate a moving average mean squared error of the generated data signals by measuring a squared difference between the generated data signals and baseline data signals; and determine a baseline noise of the photodetector based on the calculated mean squared error of the generated data signals over a predetermined period of time.

* * * * *

UNITED STATES PATENT AND TRADEMARK OFFICE
CERTIFICATE OF CORRECTION

| | | |
|---|---|---|
| PATENT NO. | : 12,235,201 B2 | Page 1 of 1 |
| APPLICATION NO. | : 17/403105 | |
| DATED | : February 25, 2025 | |
| INVENTOR(S) | : Peter Mage et al. | |

It is certified that error appears in the above-identified patent and that said Letters Patent is hereby corrected as shown below:

On the Title Page

After Item (71), please delete "Becton, Dickinson and Company, Franklin Lakes, CA (US)" and insert
-- Becton, Dickinson and Company, Franklin Lakes, NJ (US) --

Signed and Sealed this
Eleventh Day of November, 2025

John A. Squires
*Director of the United States Patent and Trademark Office*